United States Patent
León y León

(10) Patent No.: US 10,151,051 B2
(45) Date of Patent: *Dec. 11, 2018

(54) CARBON FIBERS HAVING IMPROVED STRENGTH AND MODULUS AND AN ASSOCIATED METHOD AND APPARATUS FOR PREPARING SAME

(71) Applicant: Hexcel Corporation, Dublin, CA (US)

(72) Inventor: Carlos A. León y León, Madison, AL (US)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,745

(22) Filed: Feb. 19, 2018

(65) Prior Publication Data

US 2018/0171511 A1    Jun. 21, 2018

Related U.S. Application Data

(60) Continuation of application No. 15/587,627, filed on May 5, 2017, now Pat. No. 9,938,643, which is a
(Continued)

(51) Int. Cl.
*D01F 9/22* (2006.01)
*D01F 9/32* (2006.01)
(Continued)

(52) U.S. Cl.
CPC ............... *D01F 9/22* (2013.01); *C01B 31/00* (2013.01); *C01B 32/00* (2017.08); *C01B 32/05* (2017.08);
(Continued)

(58) Field of Classification Search
CPC ........ D01F 9/22; C01B 31/00; D10B 2505/02
See application file for complete search history.

(56) References Cited

U.S. PATENT DOCUMENTS 3,716,331 A    2/1973    Schalamon et al.
4,069,297 A    1/1978    Saito et al.
(Continued)

FOREIGN PATENT DOCUMENTS

EP    0 159 365 B1    10/1985
EP    0 242 401 A1    10/1987
(Continued)

OTHER PUBLICATIONS

U.S. Appl. No. 11/562,867, filed Nov. 22, 2006, now U.S. Pat. No. 7,749,479.
(Continued)

*Primary Examiner* — Daniel McCracken
(74) *Attorney, Agent, or Firm* — Alston & Bird LLP

(57) ABSTRACT

The invention is directed to carbon fibers having high tensile strength and modulus of elasticity. The invention also provides a method and apparatus for making the carbon fibers. The method comprises advancing a precursor fiber through an oxidation oven wherein the fiber is subjected to controlled stretching in an oxidizing atmosphere in which tension loads are distributed amongst a plurality of passes through the oxidation oven, which permits higher cumulative stretches to be achieved. The method also includes subjecting the fiber to controlled stretching in two or more of the passes that is sufficient to cause the fiber to undergo one or more transitions in each of the two or more passes. The invention is also directed to an oxidation oven having a plurality of cooperating drive rolls in series that can be driven independently of each other so that the amount of stretch applied to the oven in each of the plurality of passes can be independently controlled.

21 Claims, 11 Drawing Sheets

Related U.S. Application Data continuation of application No. 15/144,060, filed on May 2, 2016, now Pat. No. 9,677,195, which is a continuation of application No. 14/797,314, filed on Jul. 13, 2015, now Pat. No. 9,340,905, which is a continuation of application No. 14/508,408, filed on Oct. 7, 2014, now Pat. No. 9,121,112, which is a continuation of application No. 14/250,491, filed on Apr. 11, 2014, now Pat. No. 8,871,172, which is a division No. 13/967,442, filed on Aug. 15, 2013, now Pat. No. 8,734,754, which is a division of application No. 12/783,069, filed on May 19, 2010, now Pat. No. 8,591,859, which is a division of application No. 11/562,867, filed on Nov. 22, 2006, now Pat. No. 7,749,479.

(51) Int. Cl.
| | | |
|---|---|---|
| D02J 1/22 | (2006.01) | |
| D02J 13/00 | (2006.01) | |
| F27B 9/28 | (2006.01) | |
| D01F 9/12 | (2006.01) | |
| C01B 32/00 | (2017.01) | |
| C01B 32/05 | (2017.01) | |
| C01B 31/00 | (2006.01) | |

(52) U.S. Cl.
CPC .............. *D01F 9/12* (2013.01); *D01F 9/225* (2013.01); *D01F 9/32* (2013.01); *D02J 1/228* (2013.01); *D02J 13/00* (2013.01); *F27B 9/28* (2013.01); *D10B 2101/12* (2013.01); *D10B 2505/02* (2013.01); *Y10T 428/2918* (2015.01)

(56) References Cited

U.S. PATENT DOCUMENTS

| | | | |
|---|---|---|---|
| 4,452,860 | A | 6/1984 | Obama et al. |
| 4,526,770 | A | 7/1985 | Pepper et al. |
| 4,609,540 | A | 9/1986 | Izumi et al. |
| 4,671,950 | A | 6/1987 | Ogawa et al. |
| 4,814,129 | A | 3/1989 | Imai et al. |
| 4,822,587 | A | 4/1989 | Hino et al. |
| 5,004,590 | A | 4/1991 | Schimpf |
| 5,051,216 | A | 9/1991 | Nakatani et al. |
| 5,066,433 | A | 11/1991 | Paul, Jr. |
| 5,078,926 | A | 1/1992 | McHenry et al. |
| 5,098,688 | A | 3/1992 | Schimpf et al. |
| 5,114,697 | A | 5/1992 | Naito et al. |
| 5,142,796 | A | 9/1992 | Anzai et al. |
| 5,149,517 | A | 9/1992 | Fain et al. |
| 5,156,831 | A | 10/1992 | Fain et al. |
| 5,209,975 | A | 5/1993 | Miyazaki et al. |
| 5,268,158 | A | 12/1993 | Paul, Jr. et al. |
| 5,281,477 | A | 1/1994 | Nakatani et al. |
| 5,595,720 | A | 1/1997 | Arai et al. |
| 6,372,192 | B1 | 4/2002 | Paulauskas et al. |
| 6,428,892 | B2 | 8/2002 | Matsuhisa et al. |
| 7,749,479 | B2 * | 7/2010 | Leon y Leon .......... D01F 9/225 423/447.2 |
| 8,591,859 | B2 | 11/2013 | Leon y Leon |
| 8,734,754 | B2 * | 5/2014 | Leon y Leon .......... D01F 9/225 423/447.2 |
| 8,871,172 | B2 * | 10/2014 | Leon y Leon .......... D01F 9/225 423/447.2 |
| 9,121,112 | B2 * | 9/2015 | Leon y Leon .......... D01F 9/225 |
| 9,340,905 | B2 * | 5/2016 | Leon y Leon .......... D01F 9/225 |
| 9,677,195 | B2 * | 6/2017 | Leon y Leon .......... D01F 9/225 |
| 2004/0096388 | A1 | 5/2004 | Ogale et al. |

FOREIGN PATENT DOCUMENTS

| | | |
|---|---|---|
| EP | 0 294 112 A2 | 12/1988 |
| EP | 0 338 212 B1 | 10/1989 |
| EP | 0 372 931 B1 | 6/1990 |
| EP | 0 378 007 A2 | 7/1990 |
| EP | 1 130 140 A1 | 9/2001 |
| GB | 911542 A | 11/1962 |
| GB | 1166251 A | 10/1969 |
| JP | 46-10496 | 3/1971 |
| JP | 47-24187 | 7/1972 |
| JP | 47-24188 | 7/1972 |
| JP | 47-26968 | 7/1972 |
| JP | 47-26982 | 7/1972 |
| JP | 49-54632 | 5/1974 |
| JP | 49-85317 | 8/1974 |
| JP | 49-87824 | 8/1974 |
| JP | 50-46928 | 4/1975 |
| JP | 52-074026 | 6/1977 |
| JP | 54-088322 A | 7/1979 |
| JP | 60-009916 A | 1/1985 |
| JP | 60-021910 A | 2/1985 |
| JP | 60-246821 A | 12/1985 |
| JP | 62-069826 A | 3/1987 |
| JP | 62-257422 A | 11/1987 |
| JP | 01-306619 A | 12/1989 |
| JP | 02-019513 A | 1/1990 |
| JP | 02-080610 A | 3/1990 |
| JP | 04-003008 Y2 | 1/1992 |
| JP | 06-220722 A | 8/1994 |
| JP | 06-220723 A | 8/1994 |
| JP | 06-264310 A | 9/1994 |
| JP | 06-264311 A | 9/1994 |
| JP | 07-070828 A | 3/1995 |
| JP | 08-006210 B2 | 1/1996 |
| JP | 09-143823 A | 6/1997 |
| JP | 09-170170 A | 6/1997 |
| JP | 11-217734 A | 8/1999 |
| JP | 11-241230 A | 9/1999 |
| JP | 2001-073232 A | 3/2001 |
| JP | 2001-192937 A | 7/2001 |
| JP | 2001-234434 A | 8/2001 |
| JP | 2002-054031 A | 2/2002 |
| JP | 2002-061034 A | 2/2002 |
| JP | 2003-027378 A | 1/2003 |
| JP | 2003-073932 A | 3/2003 |
| JP | 2004-091961 A | 3/2004 |
| JP | 2004-197278 A | 7/2004 |
| JP | 2004-300600 A | 10/2004 |
| JP | 2004-316052 A | 11/2004 |
| JP | 2005-060882 A | 3/2005 |
| JP | 2005-179794 A | 7/2005 |
| JP | 2006-104604 A | 4/2006 |
| JP | 2006-283227 A | 10/2006 |
| JP | 2006-307407 A | 11/2006 |
| WO | WO-92/03601 A2 | 3/1992 |
| WO | WO-2005/087992 A1 | 9/2005 |

OTHER PUBLICATIONS

U.S. Appl. No. 12/783,069, filed May 19, 2010, now U.S. Pat. No. 8,591,859.
U.S. Appl. No. 13/967,442, filed Aug. 15, 2013, now U.S. Pat. No. 8,734,754.
U.S. Appl. No. 14/250,491, filed Apr. 11, 2014, now U.S. Pat. No. 8,871,172.
U.S. Appl. No. 14/508,408, filed Oct. 7, 2014, now U.S. Pat. No. 9,121,112.
U.S. Appl. No. 14/797,314, filed Jul. 13, 2015, now U.S. Pat. No. 9,340,905.
U.S. Appl. No. 15/144,060, filed May 2, 2016, now U.S. Pat. No. 9,677,195.
U.S. Appl. No. 15/587,627, filed May 5, 2017, now U.S. Pat. No. 2017/0233900 A1.
Baklanova et al., "*The chemistry, morphology, topography of titanium carbide modified carbon fibers*," Carbon, vol. 46, No. 2; pp. 261-271; dated Nov. 24, 2007.
Fitzer, E., et al.; "*Pan-Based Carbon Fibers-Present State and Trend of the Technology from the Viewpoint of Possibilities and Limits to Influence and to Control the Fiber Properties by the Process Parameters*"; Carbon; vol. 27; Issue 5; pp. 621-645; dated 1989.

(56) References Cited

OTHER PUBLICATIONS

Hayashi, T. et al.; "*Residual Stress in High Modulus Carbon Fiber;*", Progress in Science and Engineering of Composites, vol. 1; pp. 97-105; dated 1982.

Isaac, D. H. et al., "*Manufacture of High Performance Carbon Fibers From Precursors of Various Diameters;*" Materials and Manufacturing Processes vol. 9, No. 5; pp. 975-998; dated 1994.

Nukaga, H., et al.; "*Evaluation of Mechanical Properties of Carbon Black Reinforced Natural Rubber by Atomic Force Microscopy;*" Journal of the Society of the Rubber Industry; vol. 79, Issue 11; pp. 509-515; dated 2006.

Ozbek: S. et al.; "*Fibre Diameter/Mechanical Behavior Correlation in Carbon Fibre Processing*" MD-vol. 35, Processing, Fabrication, and Manufacturing of Comgosite Materials, ASME; pp. 75-86; dated 1992.

Perry, R. H., et al.; "*Perry's Chemical Engineer's Handbook;*" p. 1.9; $7^{th}$ ed., McGraw Hill; dated 1997.

Tsai, J.; "*Tension Effects on the Properties of Oxidized Polyacrylonitrile and Carbon Fibers During Continuous Oxidation;*" Polymer Engineering and Science, vol. 35, No. 16; pp. 1313-1316; dated Aug. 1995.

Office Action for Chinese Application No. 200780043502.0 dated Oct. 8, 2010.

*On The Relation Between Young's Modulus and Orientation in Carbon Fibres*, Manocha; Technical Note, Fibre Science and Technology 17, 1992, pp. 221-226.

Search Report for PCT/US2007/083886 dated Nov. 13, 2008.

Search Report and Written Opinion for PCT/US2007/083886 dated Jan. 26, 2009.

Extended Search Report for European Application No. 13180241.5 dated Oct. 14, 2013.

International Preliminary Report on Patentability for PCT/US2007/083886 dated May 26, 2009.

Office Action for European Application No. 13 180 241.5 dated Apr. 5, 2016.

Office Action for European Application No. 07864019.0 dated Jan. 12, 2012, 6 pages.

European Search Report for Application No. EP 17 16 7608 dated Aug. 18, 2017, 7 pages.

\* cited by examiner

FIRST DERIVATIVE OF TENSION VS. STRETCH CURVE FOR A 0.6 dpf PAN PRECURSOR

SECOND DERIVATIVE OF TENSION VS. STRETCH CURVE FOR A 0.6 dpf PAN PRECURSOR

CARBON FIBERS HAVING IMPROVED STRENGTH AND MODULUS AND AN ASSOCIATED METHOD AND APPARATUS FOR PREPARING SAME

CROSS REFERENCE TO RELATED APPLICATIONS

This application is a continuation of U.S. application Ser. No. 15/587,627, filed May 5, 2017, which is a continuation of U.S. application Ser. No. 15/144,060, filed May 2, 2016, which is a continuation of U.S. application Ser. No. 14/797,314, filed Jul. 13, 2015, which is a continuation application of U.S. application Ser. No. 14/508,408, filed Oct. 7, 2014, which is a continuation application of U.S. application Ser. No. 14/250,491, filed Apr. 11, 2014, which is a divisional application of U.S. application Ser. No. 13/967,442, filed Aug. 15, 2013, which is a divisional application of U.S. application Ser. No. 12/783,069, filed May 19, 2010, which is a divisional application of U.S. application Ser. No. 11/562,867, filed Nov. 22, 2006, which is hereby incorporated herein in its entirety by reference.

FIELD OF THE INVENTION

The present invention relates generally to carbon fibers and more particularly to carbon fibers having improved strength and modulus, and a method and apparatus for making the carbon fibers.

BACKGROUND OF THE INVENTION

Carbon fibers have been used in a wide variety of structural applications and industries because of their desirable properties. For example, carbon fibers can be formed into a structural component that combines high strength and high stiffness, while having a weight that is significantly lighter than a metal component of equivalent properties. Carbon fibers can be manufactured by converting a precursor fiber, such as a spun polyacrylonitrile (PAN) fiber, in a multi-step process in which the precursor fiber is heated, oxidized, and carbonized to produce a fiber that is 90% or greater carbon. The resulting carbon fibers can be molded into high strength composite materials for structural applications, used in their pure form for electrical and friction applications, or can be further processed for use in adsorbent, filter, or other applications. In particular, composite materials have been developed in which carbon fibers serve as a reinforcing material in a resin, ceramic, or metal matrix.

Increasingly, carbon fibers are being used as structural components in aerospace applications. In order to meet the rigorous demands of the aerospace industry, it is necessary to continually develop new carbon fibers having both high tensile strength and high modulus of elasticity. In particular, there is a desire to develop carbon fibers having a tensile strength of 1,000 ksi or greater and a modulus of elasticity of 50 Msi or greater. Carbon fibers having individually higher tensile strength and modulus can be used in fewer quantities than lower strength carbon fibers and still achieve the same total strength for a given carbon fiber composite component. As a result, the composite component weighs less. A decrease in component weight is important to the aerospace industry and increases the fuel efficiency of aircraft incorporating such a component.

Several methods of increasing tensile strength and modulus have been explored in the prior art, and have generally had mixed results. For example, it is generally known that modulus can be increased by increasing carbonization temperatures. However, increases in carbonization temperatures result in a decrease in tensile strength. As a result, this method has generally not provided an effective means for preparing carbon fibers having improved tensile strength and modulus of elasticity.

Other methods have focused on stretching the precursor fibers before or during the process of converting the precursor fiber to a carbon fiber. It has previously been recognized in the prior art that the modulus of carbon fibers can be improved by stretching the fibers in a post-spinning step, oxidizing step, carbonizing step, or a combination thereof. However, conventional wisdom believed that the amount of stretching in the oxidizing step was limited by tension levels in the fibers that developed in response to the onset of chemical reactions, such as thermally induced cyclization and/or oxidative crosslinking of the PAN precursor fibers. The accumulation of tension caused the fibers to break at relatively low stretches under standard oxidation conditions, e.g., above 180° C. As a result, prior attempts to stretch PAN fibers during oxidation have generally been limited to a maximum amount of stretch or to a single continuous stretch.

Several studies and prior art references have further indicated that improvements beyond this initial or maximum stretch provide little if any gain in properties, and in fact may actually lead to breakage or damage in the fibers. For example, U.S. Pat. No. 4,609,540 describes a method of determining the optimum stretch to be applied to a precursor fiber in an oxidizing atmosphere. According to the '540 patent, the optimum amount of stretch corresponds to an inflection point that is determinable from a plot of % elongation versus tension, and that this optimum elongation also roughly corresponds to the maximum degree of crystalline orientation within the fibers. Beyond this inflection point, the '540 patent teaches that any gains from further stretching are minimal and may result in the development of fluff and possibly breakage.

Thus, there exists a need for carbon fibers having both high tensile strength and high modulus of elasticity, and for a method and apparatus that can be used to prepare such carbon fibers.

BRIEF SUMMARY OF THE INVENTION

The present invention provides carbon fibers having improved strength and modulus and a method and apparatus that can be used to prepare the carbon fibers. In one embodiment, the method comprises advancing a precursor fiber through an oxidation oven wherein the fiber is subjected to controlled stretching in an oxidizing atmosphere in which tension loads are distributed across a plurality of passes through the oxidation oven. As a result, the overall cumulative stretch of the fiber can be increased by selecting stretch conditions that permit distribution of the tension loads over multiple passes. Distributing tension loads amongst a plurality of passes permits the fiber to be stretched to an extent greater than previously expected. This controlled stretching of the fibers during oxidation can help provide, for example, improvements in orientation, uniformity in oxidation, and reduction in the growth of flaw-inducing crystallites, which in turn can provide improvements in the modulus of elasticity and tensile strength of the resulting carbon fibers.

In one embodiment, the method comprises passing a carbon fiber precursor polymer through an oxidation oven in which the fiber is subjected a plurality of controlled stretches so that the fiber is subjected to a % stretch in at least one pass that is between 5 and 30% and a % stretch in subsequent passes that is between 5 and 20%, and 2 to 15% stretch. In one particular embodiment, the fiber is subjected to a % stretch in a first pass that is between 5 and 30%, a % stretch in a second pass that is between 5 and 20%, and a % stretch in a third and fourth pass that is between 2 and 15%. In a further embodiment, the method comprises stretching a carbon fiber precursor fiber to a plurality of controlled stretches in the oxidation oven wherein: a) in a first pass the fiber is subjected to a % stretch that is between 10 and 40%; b) in a second pass the fiber is subjected to a % stretch that is between about 2 and 20%; c) in a third pass the % stretch is between about 2 and 16%; and d) in a fourth pass the fiber is subjected to a % stretch that is between about 2 and 12%. After the oxidation step is completed, the thus oxidized fiber can then be passed through a furnace at a temperature between about 400 and 800° C. followed by carbonizing the fiber by passing the fiber through a furnace having a temperature that is between 1300 and 1500° C.

In a further aspect of the invention, it has also been discovered that improvements in tensile strength and modulus of elasticity can be achieved by controlled stretching of the fiber in an oxidizing atmosphere in which the fiber is subjected to an amount of stretch that causes the fibers to undergo one or more transitions. In an exemplary embodiment, carbon fibers are prepared by advancing a precursor fiber through an oxidation oven in a plurality of passes in which the precursor fiber is subjected to a controlled amount of stretching in two or more of the passes so that precursor fiber undergoes at least two transitions in each of the two or more passes. The transitions comprise a region of inflection that is determinable from a plot of tension versus % stretch for a given pass. In some embodiments, the precursor fibers may be subjected to a controlled amount of stretching in which the fiber is advanced through a plurality of passes through an oxidation oven, for example from 2 to 20 passes.

In another aspect, the invention is directed to an oxidation oven that is capable of subjecting a precursor fiber to a plurality of controlled stretching passes in an oxidizing atmosphere. In one embodiment, the oxidation oven includes a plurality of drive rolls and a plurality of idler rolls, wherein a drive roll and idler roll cooperate to define a fiber pass through the oxidation oven. In one embodiment, the drive rolls can be driven independently of each other so that the speed, and alternatively the tension, on at least two or more of the passes through the oxidation oven can be independently controlled. In some embodiments, the idler rolls include a tension measuring device, such as load cell, that permits continuous monitoring of fiber tension as the fiber is being advanced through the oxidation oven.

After the oxidizing step, the remainder of the process for converting the fibers into carbon fibers can be carried out utilizing conventional methods. The fibers can be converted by advancing the oxidized fibers through a low temperature and a high temperature furnace. In one embodiment, controlled stretching of the fibers during oxidization permits further stretching of the fibers as they are advanced through the low temperature furnace by an amount, for example, between 5 and 40 percent.

Carbon fibers prepared in accordance with the invention can have a modulus of elasticity that approaches and exceeds 50 Msi and a tensile strength that approaches and exceeds 1,000 ksi. In one embodiment, the invention provides a carbon fiber having a tensile strength of at least 950 ksi and modulus of elasticity of at least 45 Msi, and wherein the atomic force microscopy (AFM) surface image of the carbon fiber is characterized by the presence of a plurality of striations of low phase angle domains and a plurality of striations of high phase angle domains that extend across the surface of the carbon fiber. In addition, carbon fibers prepared in accordance with the invention may have a Arithmetic Average Roughness (Ra) value that is greater than about 2.0, and in particular greater than 2.5, and more particularly greater than about 3.0, and a Root Mean Square Roughness (Rq) value that is greater than about 2.0, and in particular greater than 3.0, and more particularly greater than about 4.0. Further, carbon fibers prepared in accordance with the invention may have an average phase angle depth of 5 nanometers or greater. In some embodiments, the carbon fibers may have an average phase angle depth of 8 nanometers or greater and in particular, 10 nanometers or greater.

In one embodiment, carbon fibers prepared in accordance with the invention have $L_a$ values that are about 4 nm or greater, and in particular greater than about 4.5 nm, and in some embodiments greater than 5.0 nm. Carbon fibers prepared in accordance with the invention can also be characterized by the combination of high modulus and resistivity values. For example, in one embodiment, the carbon fibers can have a modulus of elasticity of at least 50 Msi, a resistivity of at least 13 $\mu\Omega \cdot m$ or greater.

Thus, the invention provides carbon fibers having improved tensile strength and modulus of elasticity, and a method and apparatus for making such carbon fibers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
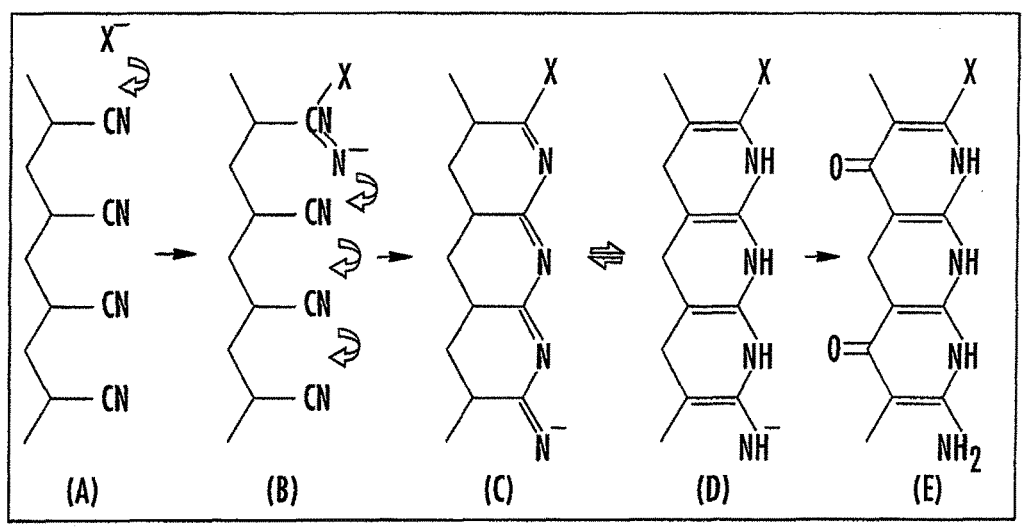
FIG. 1 is a graphical illustration of a reaction process in which a PAN precursor fiber undergoes cyclization and oxidation to form a pyridone structure.

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In one aspect, the present invention is directed to carbon fibers having improved tensile strength and modulus of elasticity. In another aspect, the invention is directed to an apparatus and method of making the carbon fibers. Carbon fibers prepared in accordance with the method of the invention can have a tensile strength approaching and exceeding 1000 ksi and a modulus of elasticity approaching and exceeding 50 Msi.

As discussed in greater detail below, carbon fibers in accordance with the invention can be prepared by subjecting a precursor fiber, such as a fiber comprising polyacrylonitrile (PAN), to a plurality of passes through an oxidizing atmosphere in which the fiber is controllably stretched in two or more of the passes through the oxidizing atmosphere. Upon completion of the oxidizing step, the fibers can be advanced through one or more additional furnaces, such as a low temperature furnace and a high temperature furnace, to complete conversion of the precursor fibers into carbon fibers. In the context of the invention the term "fiber" includes a single filament or a plurality of filaments that are bundled together, also referred to as a tow. A tow or bundle may include from about 1,000 to 100,000 individual filaments.

In the context of the invention, the term "precursor fiber" refers to a fiber comprising a polymeric material that can, upon the application of sufficient heat, be converted into a carbon fiber having a carbon content that is about 90% or greater, and in particular about 95% or greater, by weight. The precursor fiber can comprise both homopolymers and copolymers of acrylonitrile (AN), and may include copolymers such as methyl acrylate (MA), methacrylic acid (MAA), sodium methallylsulfonate, itaconic acid (IA), vinyl bromide (VB), isobutyl methacrylate (IBMA), and combinations thereof. In one embodiment, the precursor fiber comprises a polyacrylonitrile (PAN) polymer formed primarily from acrylonitrile monomers.

The precursor fibers can be prepared by melt spinning of by solvating the precursor polymers in organic and/or inorganic solvents such as dimethylsulfoxide, dimethyl formamide, zinc chloride or sodium thiocyanate solutions to form a spinning solution. In a particular embodiment, the spinning solution is formed from water, acrylonitrile polymer and sodium thiocyanate at exemplary respective weight ratios of about 60:10:30. This solution can then be concentrated through evaporation and filtered to provide the spinning solution. In one embodiment, the spinning solution comprises about 15% by weight of the acrylonitrile polymer. The spinning solution is passed through spinnerets using conventional spinning processes, such as dry, dry/wet or wet spinning, to form the polyacrylonitrile precursor. In a particular embodiment, PAN precursor fibers are made using a dry/wet spinning wherein a multitude of filaments are formed from the spinning solution and pass from the spinneret through an air gap or other gap between the spinneret and a coagulant, such as aqueous sodium thiocyanate. After exiting from the coagulant bath, the spun filaments are washed. In some embodiments, the spun filaments can be stretched up to several times their original length in hot water and steam. (See e.g., U.S. Pat. No. 4,452,860, which is incorporated herein by reference.) In addition, the polyacrylonitrile precursor fiber can be treated with sizing agents, such as silane compounds, to improve its handling during manufacture of the carbon fiber. Exemplary methods of preparing PAN precursor fibers are discussed in greater detail in U.S. Pat. No. 5,066,433, the contents of which are incorporated herein by reference.

The precursor fibers can comprise polyacrylonitrile based fibers that are made from between about 85 and 99% by weight acrylonitrile and between about 15 and 1% of other monomers such as methacrylic acid, acrylic acid, methyl acrylate, and methyl methacrylate, and combinations thereof. The polyacrylonitrile precursor fibers are in the form of bundles that each comprise between about 3000 and 50,000 filaments per bundle, and in particular between about 3000 and 24,000 filaments per bundle. The filaments may have a mean average denier between about 0.50 and 1.50, and in particular between about 0.60 and 0.85, preferably with 95% or more of the filaments in each bundle having differences in denier within +0.05 dpf. In one embodiment, the polyacrylonitrile starting material has a smooth surface, a round cross section, and an intrinsic viscosity of between about 1.5-2.5 deciliters per gram. Filament diameters prior to conversion may range from about 7.5 to 13.5 µm, and more generally from about 8.5 to 10.5 µm.

During oxidation, which is also referred to as oxidative stabilization, the PAN precursor fibers are heated in an oxidizing atmosphere at a temperature between about 150° to 600° C. to cause the cyclization and oxidation of the PAN precursor molecules. In this regard, FIG. 1 illustrates in a step-wise manner the process of cyclizing and oxidizing the PAN precursor fibers. In step (A), the nitrile groups of the PAN become aligned. In steps (B) and (C), the nitrile groups polymerize to form a polynaphthyridine ring "ladder" structure, which undergoes tautomerization in step (D) to form a polycyclic dihydropyridine. In step (E), the polycyclic dihydropyridine undergoes oxidation/dehydrogenation to form stabilized pyridone structures.

During oxidation, the extent to which the reactions illustrated in FIG. 1 occur for a given precursor are generally a function of temperature and filament diameter. This is believed to be due in part to the influence of oxygen diffusion into the filaments. At relatively low temperatures (e.g., about 240° C. or less) and/or relatively small filament diameters (e.g., about 10 microns or less) the rate of oxygen diffusion into the filament cores is promoted relative to the rate of oxygen reaction with the filament surfaces. At higher temperatures and/or larger filament diameters, oxygen tends to react faster than it is able to diffuse, and a skin layer of oxidized fiber is formed around a core where only thermally induced reactions take place. The oxidized surface layer is thought to act as a diffusion barrier for oxygen transport into the filament cores. Its presence is undesirable because it leads to skin-core differences and both structural and chemical inhomogeneities in the resulting fibers. For example, skin-core differences and structural inhomogeneities in the oxidized fibers can result in the modulus of the outer layer being higher than that of the inner layer. This modulus distribution is caused by the difference in the progression of cyclization/oxidation between the inner and outer layers of the precursor fiber. The difference in the progression of cyclization/oxidation is considered to result from a reduction in oxygen permeation into the inner portions of the fiber due in part to the selective oxidation of the outer portions of the precursor fiber, which leads to the formation of a barrier to oxygen diffusion into the fiber.

As noted above, carbon fibers of the invention can be prepared by passing a precursor fiber through an oxidation oven in a plurality of passes in which the precursor fiber is subjected to controlled stretching in two or more of the passes through the oven. In one embodiment, the controlled stretching includes independently controlling the amount of tension that is applied to the fiber in two or more of the passes through the oven. Independently controlling the stretching in controlled passes through the oxidation oven provides several advantages. For example, in one embodiment, controlled stretching permits tension loads to be distributed among the plurality of passes through the oxidation oven, which results in reducing the maximum strain rate experienced by the fiber during processing. As a result, the precursor fibers are able to be stretched to limits not previously taught in the prior art. This controlled stretching of the fibers during oxidation can help provide, for example, improvements in orientation, uniformity in oxidation, reduction in the growth of flaw-inducing crystallites, radial homogeneity, and the means to minimize or eliminate structural flaws. These benefits can in turn provide improvements in the modulus of elasticity and tensile strength of the resulting carbon fibers.

Figure 2:
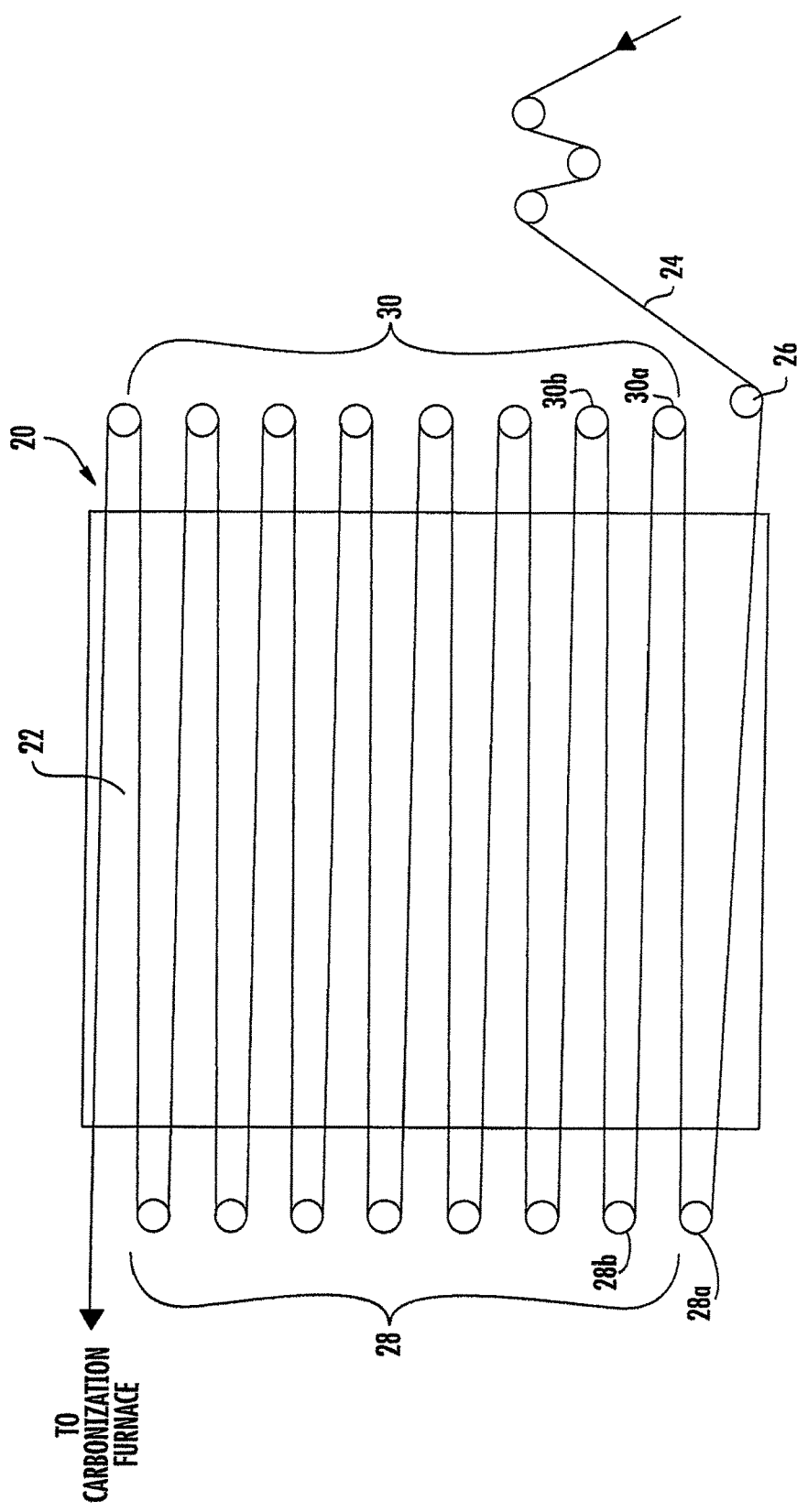
FIG. 2 is a graphical illustration of an exemplary oxidation oven that may be used in accordance with the invention.

With reference to FIG. 2, an exemplary oxidation oven that may be used to controllably stretch a precursor fiber is illustrated and broadly designated as reference number 20. The oxidation oven includes an interior 22 having an oxidizing atmosphere, such as air, that is maintained at an elevated temperature that is generally between about 150 to 600° C., particularly between about 175 and 400° C., and more particularly between about 175 and 300° C. In one embodiment, the precursor fiber 24 is advanced through the interior of the oven in a plurality of passes in which the tension applied to the carbon fiber in each of these passes can be independently controlled. In the context of the invention, the term "elevated temperature" means a temperature that is high enough to cause oxidation of the PAN precursor fibers, but is not so high as to cause undesirable effects in the fibers, such as the creation of structural defects, burning, melting, or breaking of the fibers, and the like.

The oxidation oven 20 includes a plurality of idler rolls, collectively referred to as reference number 28, and a plurality of drive rolls, collectively referred to as reference number 30. The precursor fiber 24 is provided from a source, such as a creel (not shown), and is pulled forward by driven feed roll 26. Each idler roll 28 cooperates with one or more corresponding drive rolls 30 to define a fiber pass through the oxidation oven. For the purposes of this invention, a "pass" is defined as the path traveled by the fiber from an upstream drive roll to a downstream drive roll, with at least some portion of the fiber traveling through the oxidation oven. A pass thus defined may include deflection points in the form of idler rolls, bars, or other such devices. In the illustrated embodiment, a fiber pass refers to the path of the fiber as it travels between a drive roll and a corresponding drive roll. For example, the fiber path between roll 26 and drive roll 30a defines a single fiber pass through the oxidation oven.

In some embodiments, the oxidation oven may include pairs of cooperating drive rolls that define a fiber pass through the oxidation oven. In this embodiment, a single fiber pass refers to the pathway of the fiber as it travels through the oven between a first drive roll and a corresponding second drive roll.

In some embodiments, the precursor fiber 24 may exit the oxidation oven between successive passes. In this regard, FIG. 2 illustrates an embodiment wherein the idler rolls 28 and the drive rolls 30 are disposed on the exterior of the oxidation oven. Permitting the fiber to exit the oxidation oven between successive passes can help to dissipate some of the exothermic heat released while stabilizing the PAN chains, and hence the fibers as they are being controllably stretched. Exterior rolls may also help reduce the tendency of the fibers to stick onto hot surfaces.

In other embodiments, the drive rolls, idler rolls or both may be disposed in the interior of the oxidation oven. Also, it is not necessary that idler rolls 28 be provided between successive drive rolls 30, nor is it necessary that the passes be opposite one another. For example, assuming sufficient dwell time in the oven 20, the precursor fiber 24 may be driven in a straight line through the oven 20 by a succession of drive rolls 30 nipped with idler rolls.

The drive rolls 30 can each be driven at speeds independent of the other drive rolls so that the amount of stretch or tension applied between passes can be independently controlled. For example drive roll 30a may be driven at a speed $V_1$ that may be different or the same as the speed $V_2$ at which drive roll 30b is driven. As a result, the tension applied to the fiber 24 in the pass between rolls 28a and 30a, as well as the % stretch, can be different from the tension and % stretch applied to the fiber 24 in the pass between rolls 30a and 28b. Independently controlling the speed on each roll 30 permits the % stretch on each pass to be independently controlled. As a result, the successive drive rolls can be used to distribute tensions or strain rates across a plurality of fiber passes through the oxidation oven. In one embodiment, the fiber is exposed to a strain rate that is no greater than about 10% per minute per pass.

In one embodiment, the drive rolls 30 are each separately in mechanical communication with a motor for driving the rolls. Typically, the drive rolls are each gear driven separately by an independent motor to provide improved control over the speed at which the rolls are driven, and as a result can provide improved control over the amount of tension that is applied to the fiber. Although chain drives can be used in some embodiments, this is generally less desirable because of variations in speed that may occur between the drive rolls.

The amount of drive rolls and idler rolls can be selected based on the desired properties of the resulting carbon fibers. In one embodiment, the oxidation oven may include from 2 to 20 pairs of cooperating idler and drive rolls. In other embodiments, the oxidation oven may include from 2 to 12 pairs of cooperating idler and drive rolls. In some embodiments, assemblies having more than one roll per inlet port, or configurations with rolls of different dimensions may be used to increase the contact angle between the fiber and the rolls and thus help reduce or eliminate slippage of the fiber during stretching. For example, a pair of rolls in close proximity to each other can define an S-shape in the fiber path, which can eliminate slippage of the fiber.

In some embodiments, the idler rolls 28 may include a tension measuring device, such as load cell, which permits the tension on each pass to be continually monitored. The measured tension may then be used to separately control the tension applied to the precursor fiber in a given pass by adjusting the speed of the drive rolls with respect to each other.

Stretch for a given pass is calculated from the difference between outlet speed ($V_2$) and inlet speed ($V_1$) of successive drive rolls using Equation 1:

$$\% \text{ Stretch} = 100(V_2/V_1 - 1) \tag{1}$$

For example, a 50% stretch can be attained if the ratio of relative speeds (outlet/inlet)=1.50. Stretch can be adjusted by increasing $V_2$ relative to $V_1$, decreasing $V_1$ relative to $V_2$, or varying both speeds simultaneously, until the ratio $V_2/V_1=1.50$. Note that a 50% stretch corresponds to a stretch ratio of 1.50. In the context of the present invention, a 50% stretch is referred to as "1.5×", and "2×" stretch implies 100% stretch in comparison to the original length (1×) of the fiber. A "3×" stretch represents 200% stretch over the original length (i.e., three times as long as the original).

Figure 3:
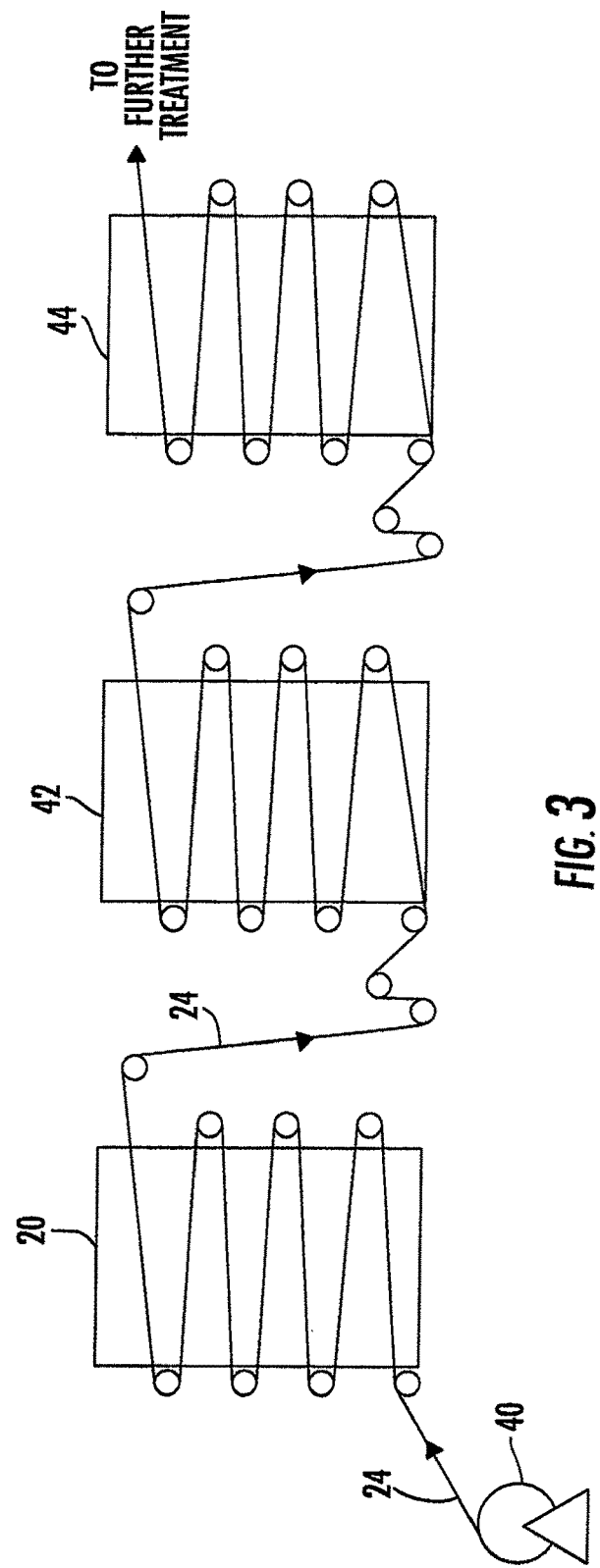
FIG. 3 is a schematic illustration of a system that can be used to convert a precursor fiber into a carbon fiber.

Upon exiting the oxidation oven, the fiber 24 can be advanced downstream to one or more additional oxidation ovens, an intermediate furnace, or the carbonization furnace. In this regard, FIG. 3 is a schematic illustration of a system and process that may be used in the conversion of the precursor fibers into carbon fibers. As shown, the precursor fiber 24 is provided via a supply roll 40. Alternatively, the precursor fiber can be provided from a plurality of precursor bundles that are combined into a single bundle with a creel. The precursor fiber is then passed through one or more oxidation ovens 20 where it is subjected to controlled stretching.

In some embodiments, the system may include a plurality of oxidation ovens where successive ovens are maintained at a temperature that is generally at least as great as that of a preceding oxidation oven. When the system includes a plurality of oxidation ovens having an ascending temperature gradation, the temperature of successive ovens is typically between about 1° to 50° C. higher than the temperature of a preceding oven, and more typically from 5° to 20° C. higher. In some embodiments, a temperature gradient may be set up in a single oxidation oven by means of different heating zones within the oven. In other embodiments, the oxidation process can be carried out in environments wherein the oxygen concentration is richer or leaner than that of atmospheric air. In still other embodiments, oxidation processing steps may be preceded or interjected by non-oxidizing gas treatments, or may be enhanced by the addition of various stabilization promoters, flow pattern arrangements, and other methods known in the art.

After passing through the oxidation oven or ovens, the stretched, stabilized fiber is then passed through a low temperature furnace 42 or furnaces, also referred to as the tar removal furnace, followed by passage through a higher temperature furnace 44 or furnaces, also referred to as a carbonization furnace. The low and high temperature furnaces contain an inert gas such as nitrogen. The temperature of the stabilized fiber in the low temperature furnace or furnaces ranges between about 300° C. and 900° C., and more typically between about 400° C. and 800° C.

The low temperature furnace is purged of volatile products issuing from the passing stabilized fiber undergoing carbonization. After leaving the low temperature furnace or furnaces, the fiber is then exposed to still higher temperatures e.g. between about 1200° C. and 2000° C., and in particular between 1250° C. and 1600° C. in the high temperature furnace or furnaces. In a preferred embodiment, the high temperature furnace is between about 1300 to 1500° C.

During travel through the low and high temperature furnaces the fiber can be subjected to further stretching so that its length is between about 1 and 40%, such as between 1 and 30%, and in particular between about 1 and 24%, longer upon its exit as compared to what it was upon entry. After completion of carbonization, the carbonized fiber may then be subjected to one or more further treatments including graphitization, surface treatments and/or sizing. Graphitization refers to heat treatments in one or more inert gas furnaces at temperatures exceeding 2000° C. Surface treatments include anodic oxidation in which the fiber is passed through one or more electrochemical baths. Surface treatments may aid in improving fiber adhesion to matrix resins and hence composite properties, as reflected by tests such as fiber-matrix interlaminar or short beam shear strength assessment. Sizing typically involves passing the fibers through a bath containing a water-dispersible material that forms a surface coating or film to protect the fiber from damage during its use. In composite applications, the water-dispersible material is generally compatible with matrix resin targeted for composite manufacture.

As previously discussed, it has been commonly accepted that the amount of % stretch that can be applied to the fiber during oxidation is limited by the accumulation of tension loads in the fibers. However, the Applicant has discovered that the overall cumulative % stretch of the fiber can be increased by distributing the tension loads or stretches in a plurality of passes through the oxidation oven. As a result, the overall cumulative stretch of the fiber can be increased by selecting stretch conditions that permit distribution of the tension loads over multiple passes. In other words, by reducing the strain rate in a given pass, the overall cumulative stretch can be increased without a corresponding increase in the maximum % stretch in the pass. This permits a higher degree of stretching to occur over the course of multiple passes, which can further help to improve the tensile strength and modulus of the resulting carbon fibers. In the context of the invention the term "cumulative stretch" refers to the overall % stretch of the fiber in comparison to the fiber prior to entering the oxidation oven. Cumulative stretch can be calculated from either the product of the stretches at each individual step or from the ratio of initial and final speeds within the section of interest.

While not wishing to be bound by theory, it is believed that these controlled incremental stretches in the oxidation oven provide several significant advantages. For example, greater amounts of cumulative stretching can help to further increase orientation within the PAN fibers, and also help reduce the formation of flaw-inducing crystallites in the fibers. When the stretches are conducted in a reactive environment, such as the oxidation oven, these gains can be locked into the fibers through chemical reactions which are occurring in the PAN polymeric chains. Stretching under non-oxidizing conditions may result in loss of some of the gains due to heat relaxation and/or entropic recovery. Additionally, strain rate distribution through controlled stretching of the fiber can also be applied in the low and/or high temperature furnaces.

It has also been further found that distribution of strain over a plurality of passes in the oxidation oven also helps to improve the uniformity of oxidation and the rate at which oxidation occurs. One advantage of controlled stretching is that tension load is applied in relatively smaller cumulative stages, as opposed to a single large step. As a result, this permits the molecules to relax between subsequent stretches. Molecules that were initially drawn to undesirable conformations or orientations may then have a new chance to be reoriented in a more desirable manner, which can in turn help to improve the tensile strength and the modulus of the resulting carbon fibers. Further, applying controlled stretching at the onset of stabilization permits thinning of the fibers, which in turn, helps to facilitate more uniform oxidation at a faster rate than non-stretched fibers. As a result, sources of inhomogeneity such as the formation of a skin-core structure in the fibers can be reduced. This can help to further reduce tension load gradients in the fibers and also improve the modulus and tensile strength of the resulting carbon fibers.

Additionally, it has been found that controlled stretching during the oxidizing step can result in reduced tension downstream of the oxidation oven(s). In one embodiment, incremental stretching in the oxidation stage can be used in conjunction with further stretching in the low temperature furnace. It is believed that more uniformly oxidized fibers are less affected by differential shear strain accumulation and can therefore tolerate more tension and hence, can handle additional stretch during the low temperature stage, which can provide additional structural gains, e.g., in molecular orientation, to be achieved in the low temperature furnace. In one embodiment, the oxidized fiber can be subjected to a % stretch in the low temperature furnace that is between about 1 and 40%, e.g., between about 1 and 30%, and 1 and 24%.

In one embodiment, multiple passes through the oxidation oven 20 can be used to distribute the tension loads over a plurality of oxidation passes. For example, the speed at which each drive roll 30 is driven with respect to other drive rolls can be used to apply various tension loads throughout a plurality of passes. In some embodiments, the speed of a subsequent drive roll can be reduced with respect a preceding drive roll, which results in a drop in tension in that pass. In some cases, a drop in tension can be used to permit shrinkage of the fiber during oxidation. As noted above, stretching in a reactive environment may help lock-in mechanical structural gains that are obtained as a result of the controlled stretching. As a result, in some embodiments, the properties of fibers may first be enhanced by controlled stretching and then the fibers are permitted to shrink without losing the gains provided by the stretching process. This may permit the recapture of filament denier or an increase in weight per unit length that was lost in the previous stretches.

The desired amount of stretching in a given pass, the length of each pass, the number of passes in an oxidation oven, and the residence time of the fiber within the oxidation oven are dependent on the composition of the precursor fibers and the desired properties of the carbon fibers. In one embodiment, the precursor fibers may make between about 2 and 20 passes through the oxidation oven, and in particular between about 2 and 10, such as between 4 and 8 passes through the oxidation oven. In some embodiments, the length of each pass may range between 4 and 40 feet. Generally, the residence time in the oxidation oven for each pass is between about 0.1 to 20 minutes, such as between about 1 to 12 minutes or 2 to 10 minutes.

In one embodiment, carbon fibers having improved strength and modulus can be prepared by advancing the precursor through the oxidation oven in multiple passes wherein the tension on the precursor fiber in at least two or more of the passes is between about 100 to 1,000 mg/den. Generally, the maximum amount of % stretch to which the fiber is subjected to in a given pass is selected so that the strain rate is about 10%/minute or less, and in particular less than about 5%/minute per pass. Methods for determining the amount % stretch to apply in a given pass for a given fiber are discussed in greater detail below. The gains in mechanical properties attained through controlled stretching are not restricted by the initial diameter, denier, or chemical composition of the precursor fiber.

In one embodiment, carbon fibers having improved tensile strength and modulus of elasticity can be prepared by subjecting a precursor fiber having a filament denier of about 1.5 dpf or less, and in particular less than 0.8 dpf to a cumulative % stretch that is between 5 and 100% and in particular between 15 and 60%. In yet another embodiment, the precursor fiber is subject to a cumulative % stretch that is between 5 and 70%, and more typically between 15 and 60%. In other embodiments, the precursor fiber is subjected to a plurality of controlled stretches that result in a 20 to 70% reduction in the fiber's diameter in comparison to the original diameter of the fiber prior to the oxidation step. In still other embodiments, the precursor fiber has a reduction in diameter that is between 25 and 50%, and in particular, between 30 and 45%. In one particularly useful embodiment, the method of stretching the precursor fibers comprises subjecting the precursor fiber to a plurality of controlled stretches in an oxidation oven wherein: a) the % stretch in a first pass is between 10 and 40% stretch; b) the % stretch in a second pass is between 2 and 20% stretch; c) the % stretch in a third pass is between 2 and 16% stretch; and d) the % stretch in a fourth pass is between 2 and 12% stretch. In a further embodiment, the oxidized fiber can be subjected to a % stretch in a low temperature furnace that is between 1 and 30% stretch. In one embodiment, carbon fibers prepared in accordance with invention can have tensile strength in excess of 950 ksi, and in particular in excess of 1000 ksi, and a modulus of elasticity in excess of 44 Msi, and in particular in excess of 50 Msi.

In one embodiment, the oxidized fibers can be carbonized, electrochemically surface treated, and sized with a protective coating for use in the preparation of structural composites, such as prepregs. In one embodiment, prepregs comprising the inventive carbon fibers can be prepared that have an interlaminar or short beam shear strength that is in excess of 19 ksi.

Figure 4:
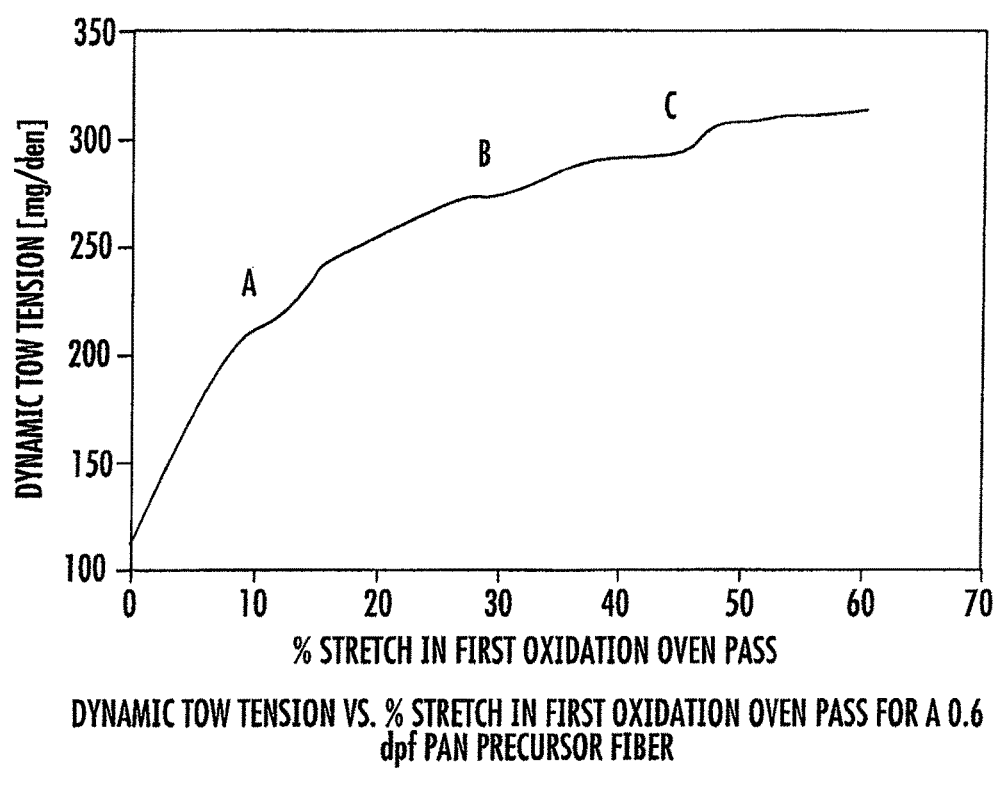
FIG. 4 is a graphical plot of tension vs. % stretch that depicts a fiber undergoing multiple transitions as it is being stretched.

In a further aspect, the present invention is based on the recognition that improvements in modulus of elasticity and tensile strength of carbon fibers can be achieved by controlled stretching of the precursor fibers beyond limits previously taught in the prior art. In particular, it has been discovered that these improvements can be obtained by subjecting the precursor fibers to a sufficient amount of stretch during oxidation that causes the fibers to undergo one or more transitions in two or more passes. In one embodiment, carbon fibers are prepared by advancing a precursor fiber through an oxidizing atmosphere, such as an oxidation oven, in a plurality of passes in which the precursor fiber is subjected to controlled amount of stretching in two or more of the passes so that precursor fiber undergoes at least two transitions in each of the two or more passes. The transitions comprise a region of inflection that is determinable from a plot of tension versus % stretch for a given pass. FIG. 4 is an exemplary graphical plot of dynamic tow tension versus % stretch in which a precursor fiber has undergone at least three distinct transitions in a single pass through an oxidation oven. In the context of the invention, the term "dynamic tow tension" refers to the average tension measured in-line while running a tow through a processing step. Specifically, in FIG. 4, dynamic tow tension refers to the steady-state tension in a particular pass experienced by tows of PAN fibers being continuously passed through the oxidation oven. The term "% stretch" is the same as defined by Equation 1 above.

From this plot, it can be seen that the fiber can undergo multiple transitions as it is subjected to controlled stretching in the oxidation oven. In the illustrated plot, the precursor fiber is depicted as having undergone three transitions. As stretch increases from 0% to some initial value, tension rises primarily because the constitutive molecules stretched in prior steps tend to relax and contract. This relaxation (also known as entropic recovery) is a function of applied stretch because the molecules are more able to disentangle themselves from their neighbors at higher stretches. Disentangled molecules are in turn able to carry more loads, but at increasingly higher % stretches their disentanglement and re-orientation becomes more difficult. Depending on parameters such as temperature, residence time, filament diameter, and extent of reaction, tension continues to rise until further disentanglement and re-orientation become unfavorable. At this point, point A in FIG. 4, the tension begins to level off and a region of inflection occurs as the precursor fibers are able to undergo more stretching without an increase in tension at the rate previously experienced.

If higher stretches are applied, the molecules within the weakest among the more ordered (or pseudocrystalline) domains begin to be pulled apart and are forced to slide past each other. This requires overcoming the strong nitrile dipole and/or hydrogen bonding interactions that hold those regions together. Oxidative stabilization reactions can assist in this regard. During oxidative stabilization, nitrile groups polymerize to form ladder structures (see briefly, FIG. 1). These ladder structures are oxidized very quickly, provided oxygen can diffuse fast enough to reach them. Otherwise, these ladder structures remain in the core of the filaments. However, nitrile group polymerization (cyclization) consumes strong dipoles, and hence promotes the sliding of molecules past each other. This promotes additional disentanglement and re-orientation, along with a rise in effective tow tension.

As tension continues to rise, the cyclization frees more molecules for sliding and re-orientation. Oxidation of the ladder polymer, along with nitrile group crosslinking between neighboring chains (resulting in the growth of misoriented or angled ladder molecules), begin to contribute significantly to the rise in tension. The tension begins to level off gradually as the stabilization process unfolds and the degree of interchain crosslinking increases. At a result, the precursor fibers are less able to sustain the same rate of stretching. Consequently, an area of inflection occurs at point B in FIG. 4. Depending on the extent of nitrile group polymerization, ladder polymer formation, and oxidative reactions, fibers stretched at relatively low strain rates can retain significant stretching potential. If the stabilization reaction is limited by the rate of oxygen diffusion, a skin-core structure develops, and the buildup of tension in the skin is larger than that in the core. This causes stress gradients that in the past may have limited the extent to which PAN fibers have been drawn during stabilization. However, as noted above, incremental stretching permits tension to be applied in small cumulative stages so that the molecules can relax between subsequent stretches. As a result, molecules that were initially drawn to undesirable conformations or orientations may then have a new chance to be reoriented in a more desirable manner.

Additionally, the higher % stretches at this stage may result in thinner filaments. Stretching the fibers during stabilization promotes oxygen diffusion into the core by increasing the effective filament surface area and reducing the diffusion distance. This in turn can lead to more homogeneous fibers. However, the tension buildup in more oxidized fibers is larger than in less oxidized fibers. Hence, at sufficiently high stretches the tension begins to rise again.

Eventually as tension continues to rise past point B, the molecules may begin to break due to the fracture of chains or tie molecules connecting the remaining microfibrils. At this point, the shortest and/or most stressed (e.g., taut) among the tie molecules linking the remaining ordered domains may begin to break, which may result in their load burdens be transferred to longer and/or less stressed (e.g., slack) tie molecules. Consequently, at this point the tension begins to level off again and a third region of inflection occurs at point C on FIG. 4. Further transitions may be attributed to structural disruptions such as porosity development. Significant porosity development may be paralleled by a decrease in stabilized fiber density (ox-density) measured by helium pycnometry.

In one embodiment, the occurrence of the transitions can serve as a guide for the % stretch that can be applied in each pass. Using the transitions as a guide can help determine the maximum amount of stretch that can be applied in a given pass so that the overall cumulative stretch can be increased. The exact positions and magnitudes of the transitions can vary depending on processing parameters, such as temperature, residence times, heating rates, and the like, as well as on fiber properties, such as composition, filament diameter, structural morphology, and the like. Additionally, the positions of the transitions may also vary between subsequent passes in the oxidation oven. However, in practice the transitions can be tracked during the oxidizing step from direct "dynamic tow tension" vs. "dynamic equilibrium stretch" readings. The number of transitions for a given precursor generally depends on the target properties of the resulting carbon fiber products. In the case of PAN fiber stabilization, at least one transition per pass is advantageous, and two or more transitions per pass in at least two passes may be desirable. For example, when the fiber undergoes more than two transitions in a given pass, any negative impact in carbon fiber mechanical properties due to taut tie molecule breakage (and subsequent radical reactions) or local porosity generation may still be offset by gains in molecular orientation and overall homogeneity due to improved oxygen penetration and to the elimination of flaws. An example of how to identify the transitions during oxidative stabilization is illustrated in Table 1 below.

Table 1 lists dynamic tow tension vs. stretch curve data for a 0.6 dpf PAN precursor fiber for a single pass through the oxidation oven. In the example in Table 1, dynamic tow tensions were determined at stretch increments of about 3% per data entry. In other embodiments, the stretch increments may range from about 0.1 to 10%, or 2 to 6%. The second column lists the dynamic tensions measured after a stable tension reading was reached. Column 3 lists the differences (Diff) between tensions measured in two sequential stretch increments. For example, between 0 and 3% stretch, Diff=1092-795=297 g. Column 4 lists the differences (Der) between sequential differences calculated from Column 3. For example, between 0 and 6% stretch, Der=219-297=-78 g. Note that the Der value is initially negative because the initial portion of the curve represents a decreasing slope (i.e., it is a "concave downwards" curve). The terms "Diff" and "Der" are related to the first and second derivatives of the curve, respectively. Hence, the second derivative term "Der" would be negative while the curve presents downwards concavity (or a decreasing slope). This "Der" term would also switch to positive if the slope of the curve began to increase (or the curve adopted an "upwards" concavity). The points of concavity reversal could simply be identified by recording dynamic tensions as a function of stretch increments and noting the stretches at which the "Der" function becomes positive.

TABLE 1

Determination of Transition Points in Dynamic Tension vs. Stretch Curves.

| Stretch % | Tension (g) | Diff (g) | Der (g) | Tension (mg/den) | Diff (mg/den) | Der (mg/den) |
|---|---|---|---|---|---|---|
| 0 | 795 | — | — | 110 | — | — |
| 3 | 1092 | 297 | — | 152 | 41.25 | — |
| 6 | 1311 | 219 | −78 | 182 | 30.42 | −10.83 |
| 9 | 1499 | 188 | −31 | 208 | 26.11 | −4.31 |
| 12 | 1571 | 72 | −116 | 218 | 20.00 | −16.11 |
| 15 | 1715 | 144 | 72 | 238 | 10.00 | 10.00 |
| 18 | 1790 | 75 | −69 | 249 | 10.42 | −9.58 |

TABLE 1-continued

Determination of Transition Points in Dynamic Tension vs. Stretch Curves.

| Stretch % | Tension (g) | Diff (g) | Der (g) | Tension (mg/den) | Diff (mg/den) | Der (mg/den) |
|---|---|---|---|---|---|---|
| 21 | 1855 | 65 | −10 | 258 | 9.03 | −1.39 |
| 24 | 1909 | 54 | −11 | 265 | 7.50 | −1.53 |
| 27 | 1957 | 48 | −6 | 272 | 6.67 | −0.83 |
| 30 | 1961 | 4 | −44 | 272 | 0.56 | −6.11 |
| 33 | 2018 | 57 | 53 | 280 | 7.92 | 7.36 |
| 36 | 2068 | 50 | −7 | 287 | 6.94 | −0.97 |
| 39 | 2094 | 26 | −24 | 291 | 3.61 | −3.33 |
| 42 | 2110 | 16 | −10 | 293 | 2.22 | −1.39 |
| 45 | 2120 | 10 | −6 | 294 | 1.39 | −0.83 |
| 48 | 2205 | 85 | 75 | 306 | 11.81 | 10.42 |
| 51 | 2218 | 13 | −72 | 308 | 1.81 | −10.00 |
| 54 | 2245 | 27 | 14 | 312 | 3.75 | 1.94 |
| 57 | 2245 | 0 | −27 | 312 | 0.00 | −3.75 |
| 60 | 2256 | 11 | 11 | 313 | 1.53 | 1.53 |

Figure 5:
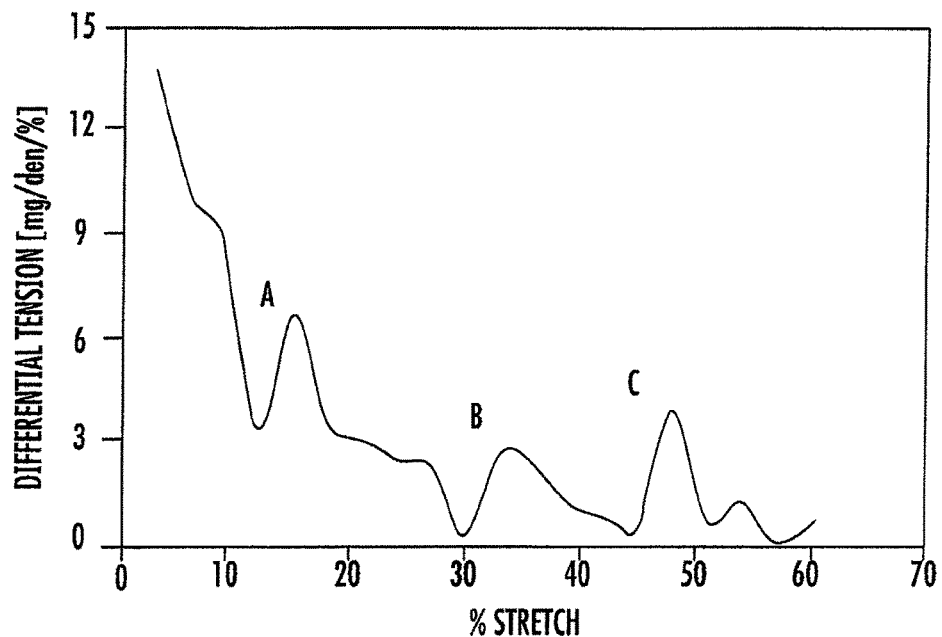
FIG. 5 is a graphical plot of the first derivative of tension vs. % stretch that highlights the transition points.
Figure 6:
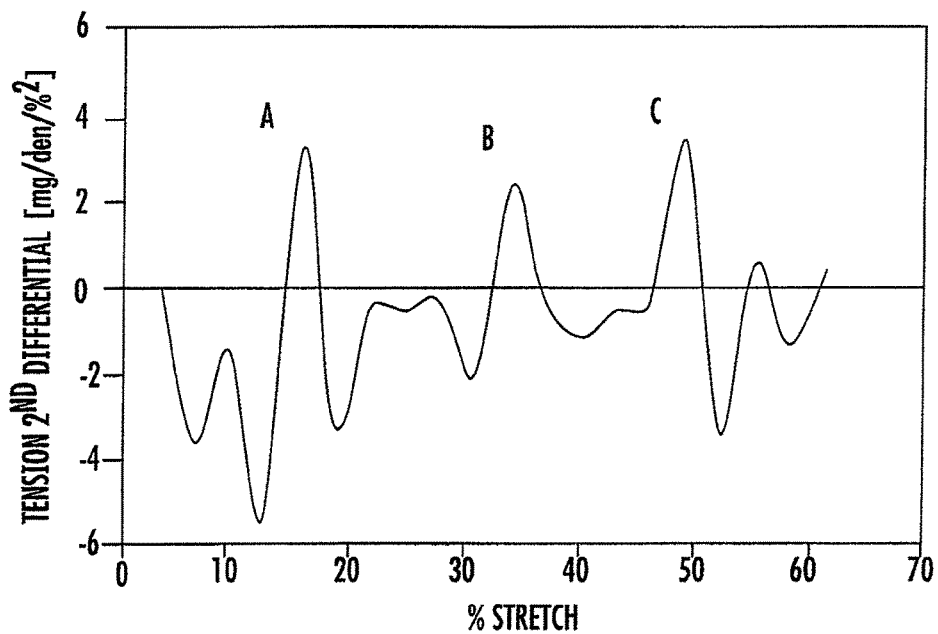
FIG. 6 is a graphical plot of the second derivative of tension vs. % stretch that highlights the transition points.

In the example given in Table 1, three distinct transitions occur, which can be noted at 15%, 33%, and 48% stretch, respectively. Higher stretch transitions become difficult to distinguish due to the smaller tension differences involved. Columns 5-7 in Table 1 present the same information as in Columns 2-4, but in units of mg/den (i.e., tension normalized by the tow's linear density, in order to facilitate comparison with tows of different deniers). With reference to FIGS. 5 and 6, the occurrence of the transitions can also be determined from a plot of the first and second derivatives, respectively.

As briefly noted above, the process described above in connection with Table 1 can be used to determine the % stretch to be applied in a given pass. Once a desired or maximum limit is determined for the first % stretch, the above process is repeated for the second pass. This process can then be repeated x number of times for x number of fiber passes through the oxidation oven. Generally, the process does not need to be repeated once the desired % stretch is determined for each pass for a given precursor fiber at a given set of conditions.

From the foregoing discussion, it should be evident that the present invention provides a method for improving the tensile strength and modulus of carbon fibers by controllably stretching the fibers in a plurality of passes through an oxidation oven. Carbon fibers prepared in accordance with the invention are characterized by having both high tensile strength and high modulus of elasticity. As discussed above, the advantageous properties of the carbon fibers can be obtained by subjecting the precursor fibers to controlled stretching during oxidative stabilization. In addition to improvements in tensile strength and modulus of elasticity, carbon fibers prepared in accordance with the invention have unique properties and structural features that have not been hitherto found in prior art carbon fibers. For instance, carbon fibers prepared in accordance with the invention may exhibit a high proportion of phase angles with values that are lower than average, increased surface roughness, increased average phase angle depths, higher resistivity values, and more uniform crystallinity distribution.

FIGS. 7A through 7F are surface phase images of various carbon fibers that were obtained using Atomic Force Microscopy (AFM) in Tapping Mode. The surface phase images were obtained with a NanoScope IIa Scanning Probe Microscope manufactured by Digital Instruments Co. (Santa Barbara, Calif.). Tapping Mode AFM operates by scanning a tip attached to the end of an oscillating cantilever across the sample surface. The cantilever is oscillated at or around its resonance frequency with amplitude ranging between 20-100 nm. The tip lightly taps onto the sample surface as it swings during x-y-z scanning. Tip-surface interactions cause the cantilever to oscillate with a characteristic phase pattern. Phase patterns (in the form of phase contrast images) can be used to differentiate between regions of strong and weak surface-tip interactions. These regions may in turn be related to material features such as, e.g., crystalline domains. In FIGS. 7A through 7F, individual filaments of each carbon fiber sample (desized when needed) were mounted onto special AFM holders. Three surface regions (1 μm×1 μm) of each filament were scanned with an amplitude of 20 nm to generate the phase angle images for the samples. Phase angle depth refers to the average distances between the peaks and valleys in the AFM images.

Figure 7A:
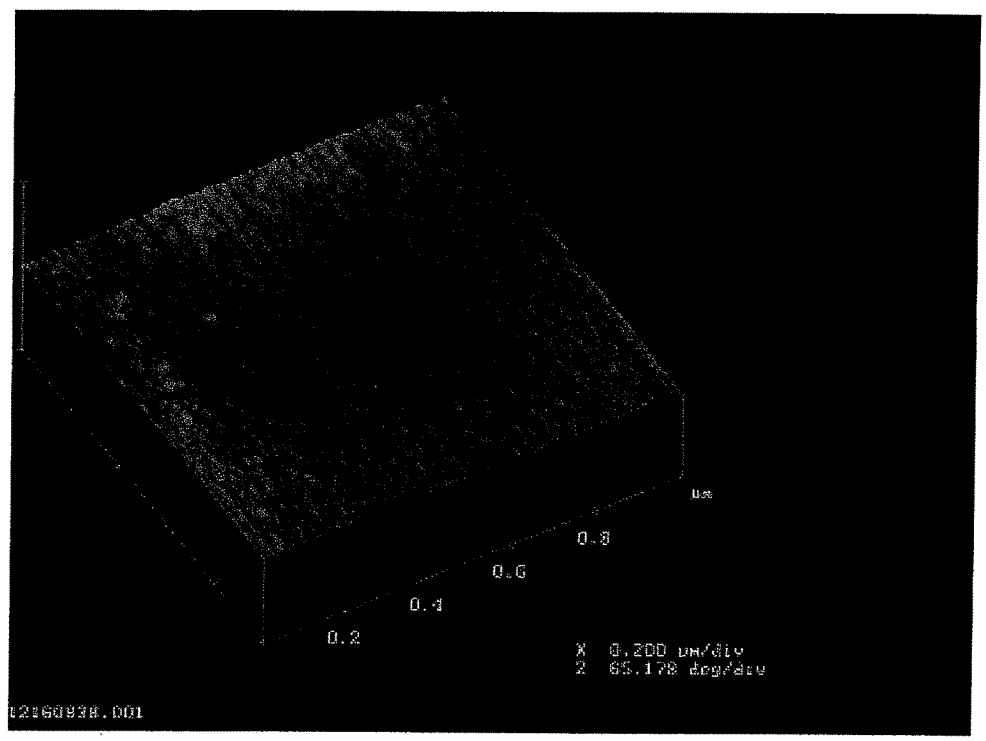
FIGS. 7A and 7B are Atomic Force Microscopy Image (AFM) of carbon fibers that are prepared in accordance with a prior art method of stretching carbon fibers in an oxidation oven.
Figure 7B:
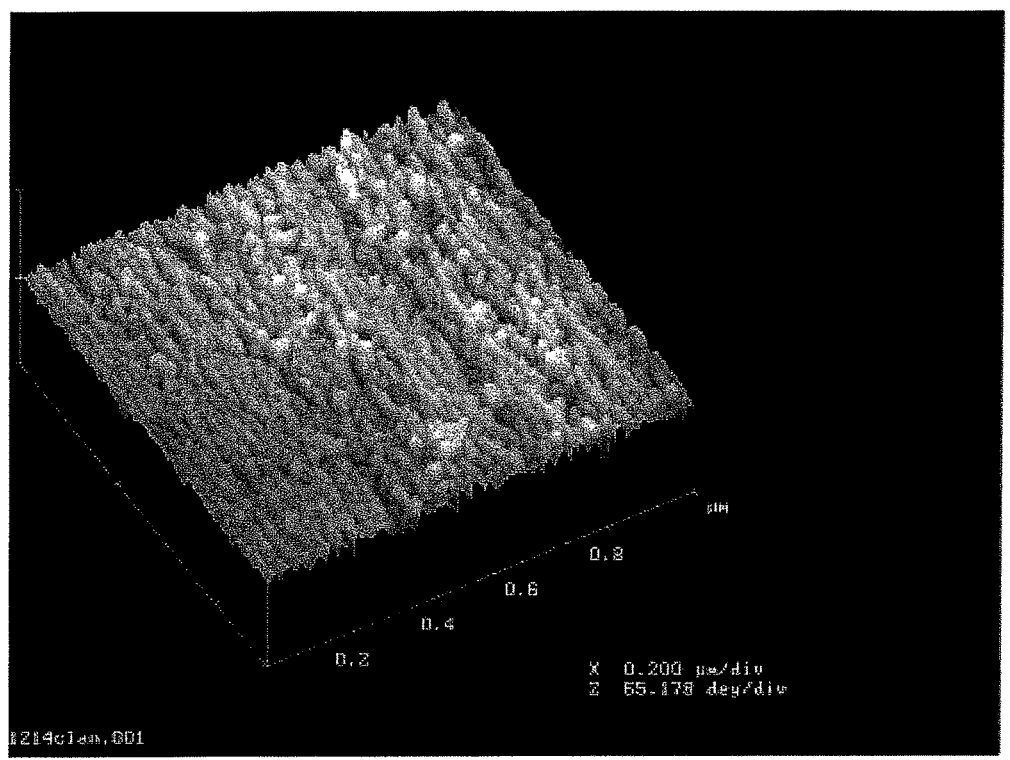
Figure 7C:
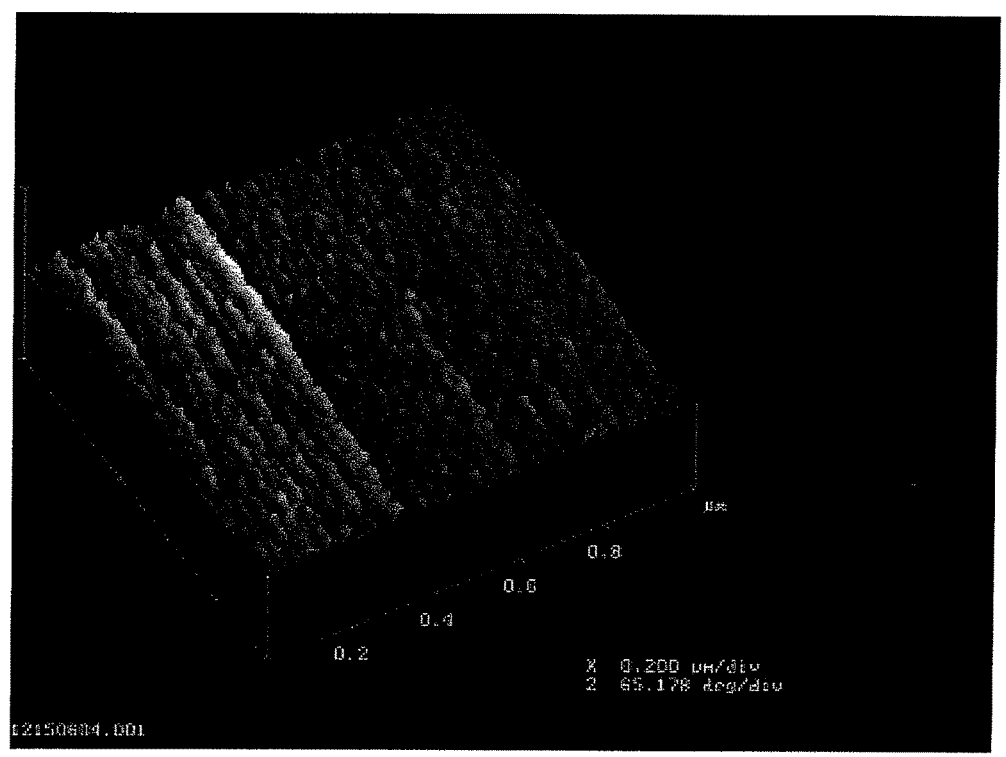
FIGS. 7C through 7F are Atomic Force Microscopy Images (AFM) of carbon fibers that are prepared in accordance with the invention.
Figure 7D:
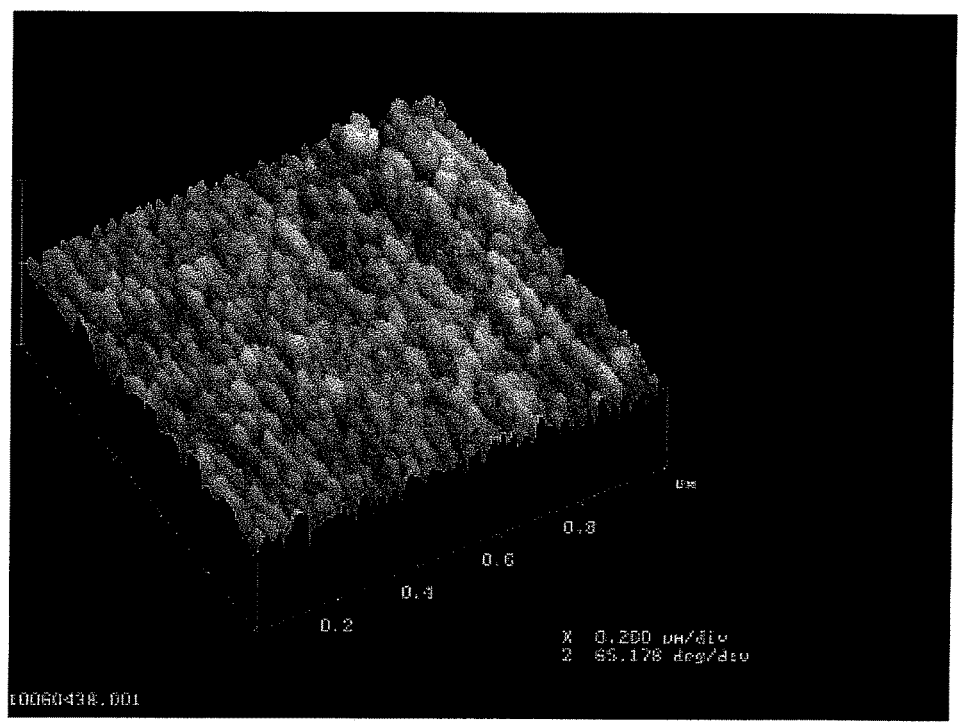
Figure 7E:
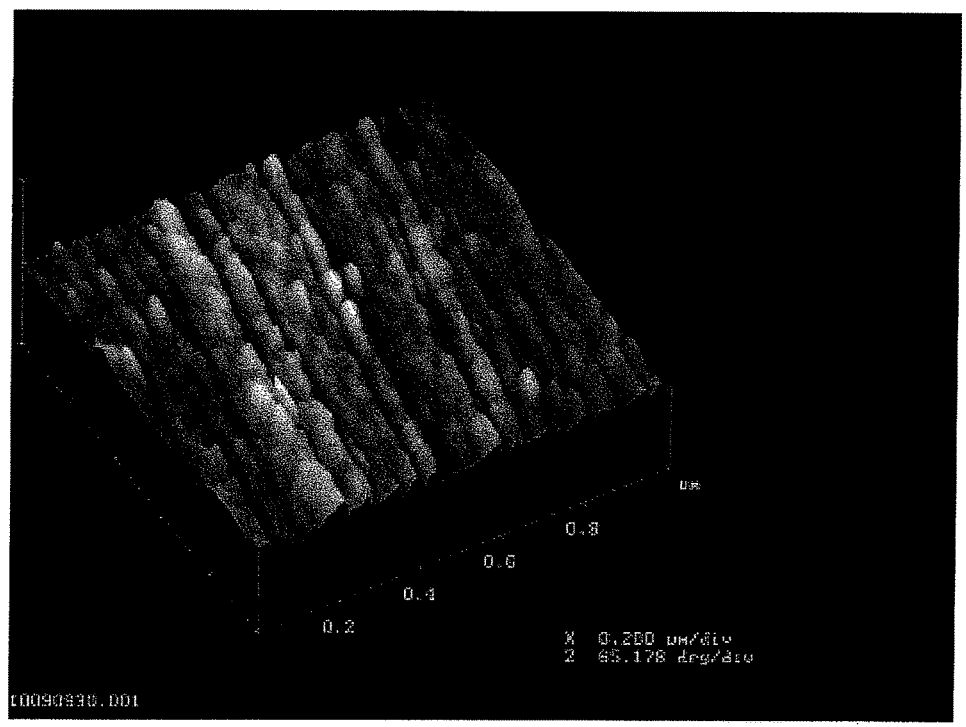
Figure 7F:
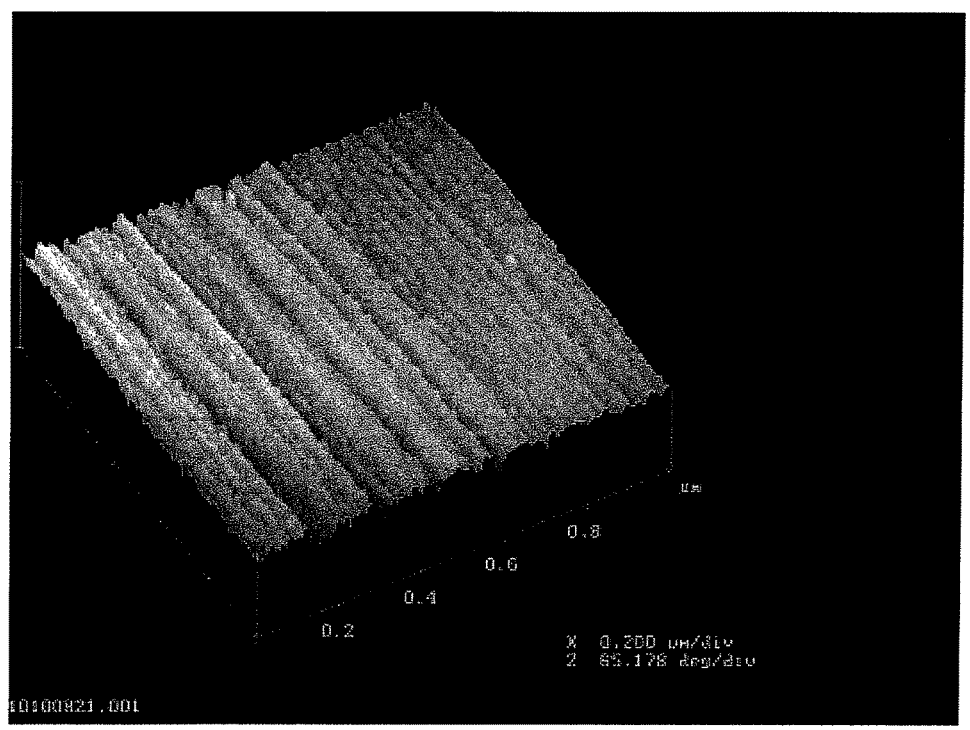

FIG. 7A is a surface phase image of a carbon fiber that was prepared by subjecting a PAN precursor fiber to a 15% cumulative stretch in a single pass in an oxidation oven. FIG. 7A corresponds to Comparative Example 1 which can be found in Table 3 below. FIG. 7B is a surface phase image of a carbon fiber that was prepared in general accordance with Comparative Example 1, except that it was carbonized at a temperature in excess of 1500° C. in order to increase modulus according to prior art methods. FIGS. 7C through 7F are surface phase images of carbon fibers that were prepared in accordance with the invention. FIGS. 7C, 7D, 7E, and 7F correspond to Examples 23, 35, 29, and 34, respectively, the processing details of which can be found in Table 6 below.

The lighter regions in the AFM images correspond to regions of higher phase angles on the carbon fibers and the darker regions correspond to regions of the carbon fibers of lower phase angles. All AFM images are presented at the same scales to facilitate their direct comparison. In FIGS. 7A and 7B the AFM surface image of the carbon fibers prepared with conventional stretching methods are characterized by dark regions and/or light regions. As shown in FIGS. 7C through 7F, the AFM images of the carbon fibers prepared in accordance with the invention are characterized by the presence of a plurality of striations that extend across the surface of the fibers. In one embodiment, the AFM images of the carbon fibers prepared in accordance with the invention are characterized by the presence of a plurality of striations of dark regions and a plurality of striations of light regions. For example, in FIGS. 7C and 7D the AFM image shows striations of both high phase angle domains and low phase angle domains that extend across the surface of the carbon fibers. These striations are even more apparent in FIGS. 7E and 7F, which present images of carbon fibers within the same range of mechanical properties but analyzed after having subjected them to in-line surface treatment and sizing steps as described in the Examples Section. Specifically, the images in FIGS. 7E and 7F also show a plurality of striations of low phase angle domains and striations of high phase angle domains that extend across the surface of the carbon fibers. Referring back to FIGS. 7A and 7B and the AFM images of the carbon fibers prepared in accordance with conventional stretching methods, the striations on the surface are less pronounced and coherent than in the images of the present invention. It should be further noted that, unlike dimensional surface topography images, phase angle depth images are insensitive to surface curvature (or filament diameter) effects. Therefore, if the striations represent domains of different degrees of structural order, the AFM images indicate that the process of the invention is substantially altering the surface morphology of the carbon fibers. The generation of ordered domains in the form of long striations is consistent with increases in the parameter $L_a$ (associated with average crystalline width or ribbon length) determined by X-ray diffraction analysis, as discussed in greater detail below. In Table 2 below, it can be seen that the changes in the surface structures of the fibers are accompanied by increases in both the tensile strength and modulus of elasticity in the inventive carbon fibers. In comparison, the carbon fiber in FIG. 7A has a tensile strength and a modulus of elasticity that is significantly less than the carbon fibers depicted in FIGS. 7C through 7F. Similarly, the carbon fiber in FIG. 7B has a high modulus but its tensile strength falls below those of fibers of the invention.

Additionally, the three-dimensional AFM images permit the surface of the carbon fibers to be characterized on the basis of surface features such as topographical roughness and phase angle depth distribution. In Table 2 below, various parameters representing the phase angle depth and roughness of the carbon fibers in the AFM images have been characterized.

with different frequency of peaks can have the same average Ra and/or Rq values. Nonetheless, surface roughness values provide quantitative information that complements the information provided by phase image depth analysis alone. The AFM images in FIGS. 7A through 7F were scanned over the entire 1 μm×1 μm region and then Ra and Rq values were calculated using the above equations. A section roughness of the AFM images in FIGS. 7A through 7F was also analyzed by drawing an imaginary slice 300 nm long and perpendicular to the orientation of the ordered phases.

The data in Table 2 show how the mechanical properties of representative carbon fibers prepared in accordance with invention vary as a function of parameter Ra. The higher the roughness in phase angle contrast, the higher the mechanical

TABLE 2

Summary of AFM Analysis for Carbon Fibers Depicted in FIGS. 7A-7F

| FIG. No. | Example No.[a] | Depth [nm] | | Section [L = 300 nm] | | Roughness | | Tensile Strength (ksi) | Modulus (Msi) |
|---|---|---|---|---|---|---|---|---|---|
| | | Average | Maximum | Rq [°] | Ra [°] | Rq [°] | Ra [°] | | |
| FIG. 7A | Comp. 1 | 4.7 | 11 | 1.180 | 0.830 | 1.581 | 1.246 | 932 | 42.7 |
| FIG. 7B | Comp. AFM 1[b] | 8.9 | 23 | 3.702 | 2.649 | 3.198 | 2.509 | 732 | 55.1 |
| FIG. 7C | 23 | 15.1 | 32 | 4.499 | 3.363 | 3.956 | 3.038 | 1012 | 46 |
| FIG. 7D | 35 | 14.0 | 50 | 7.474 | 5.391 | 8.198 | 5.925 | 1107 | 52.2 |
| FIG. 7E | 29[c] | 13.1 | 40 | 5.413 | 3.772 | 5.261 | 4.013 | 1113 | 51.5 |
| FIG. 7F | 34[c] | 11.1 | 40 | 4.078 | 2.707 | 4.868 | 3.512 | 1058 | 47.3 |

[a]From Table 6 in the Example Section below.
[b]Prepared in accordance with Comparative Example 1, but carbonized at >1,500° C. (see Table 4).
[c]Includes surface treatment and sizing (see the Example Section below); samples were desized prior to scanning.

An analysis of the depth profiles for the carbon fibers in FIGS. 7A through 7F reveals that the carbon fibers prepared in accordance with the invention have broader depth distribution functions (wider peaks) and a higher maximum depth (peak tails shifted towards increasing depths). Generally, carbon fibers prepared in accordance with the invention have an average phase angle depth greater than about 5 nm, and in particular greater than about 8 nm, and more particularly, greater than about 10 nm.

The surface roughness of the carbon fibers in the AFM images was also characterized with Arithmetic Average Roughness (Ra) and Root Mean Square Roughness (Rq) values.

Arithmetic Average Roughness (Ra) is calculated according to the following equation:

$$Ra = \frac{\sum_{i}^{n} |Z_n|}{n} \quad (2)$$

Root Mean Square Roughness (Rq) is calculated according to the following equation:

$$Rq = \sqrt{\frac{\sum_{i}^{n} (Z_n)^2}{n}} \quad (3)$$

In equations (1) and (2), $Z_i$ values represent all the "n" deviations in surface height measured from the mean data plane in the AFM image. It should be noted that two surfaces properties of the corresponding carbon fibers. For example, Comparative Example 1 has a Ra value of about 1.2, a tensile strength of 932 ksi, and a modulus of elasticity of 42.7 Msi. Similarly, the sample carbonized at a temperature exceeding 1500° C. (Comparative AFM 1) has an overall Ra value of about 2.5, with a modulus exceeding 50 Msi, but a tensile strength of only 732 ksi. The inventive carbon fibers having Ra values greater than about 2 have a tensile strength and modulus of elasticity that are significantly improved over the comparative example carbon fibers. For instance, Example 23 has a Ra value greater than 3 with a tensile strength of 1012 ksi and a modulus of elasticity 46 Msi. Example 29 having a Ra value greater than 4 has a tensile strength of 1113 ksi and a modulus of elasticity 51.5 Msi. Generally, carbon fibers prepared in accordance with the invention may have a Ra value that is greater than about 2.0, and in particular greater than 2.5, and more particularly greater than about 3.0.

The data in Table 2 also show how the mechanical properties of representative carbon fibers prepared in accordance with invention vary as a function of parameter Rq. As with parameter Ra, the higher the roughness in phase angle contrast, the higher the mechanical properties of the corresponding carbon fibers. Generally, carbon fibers prepared in accordance with the invention may have an Rq value that is greater than about 2.0, and in particular greater than 3.0, and more particularly greater than about 4.0.

From the data in Table 2 and the AFM images in FIGS. 7C through 7F, it can be seen that the inventive process of preparing the fibers results in fiber having increased tensile strength and modulus of elasticity, and that this increase in strength and modulus is accompanied by structural changes that are occurring in the fibers, e.g., the appearance of continuous striations on the surface of the fibers, increases in phase angle depths, and increases in roughness on the surface of the fibers.

In addition to the surface features discussed above, carbon fibers prepared in accordance with the invention also have unique crystallite dimensions ($L_a$ and $L_c$). Table 3 below contains crystallite data for carbon fibers prepared in accordance with the invention. The data in Table 3 were obtained by subjecting various carbon fibers to X-ray diffraction analysis. The measurements were carried out in reflection mode with the fiber strands aligned perpendicular to the diffraction plane on a wide angle powder diffractometer using CuKα radiation with a diffracted beam monochromator. Determination of $L_a$ and $L_c$ used the relationship of $L_a=1.84 \times \lambda/(B \times \cos(\theta))$ and of $L_c=0.89 \times \lambda/(B \times \cos(\theta))$, respectively, wherein λ is 1.54 Å, B is the peak width in (° 2 θ), and θ is the diffraction angle.

TABLE 3

Carbon Fiber X-ray Diffraction Data

| Example No. | Carbonization Temperature (° C.) | Strength (ksi) | Modulus (Msi) | Diameter (μm) | Density (g/cm³) | $L_c$ (Å) | $L_a$ (Å) |
|---|---|---|---|---|---|---|---|
| Comparative Example 3 | 1.315 | 982 | 44.9 | 4.3 | 1.809 | 16.8 | 43.8 |
| 60 | 1.315 | 977 | 47.1 | 3.5 | 1.815 | 16.4 | 48.7 |
| 29 | 1.315 | 1113 | 51.5 | 3.6 | 1.809 | 16.4 | 56.5 |

Generally, the parameter $L_a$ is associated with the "crystallite width" or "ribbon length", and parameter $L_c$ is associated with "crystallite height." In one embodiment, carbon fibers prepared in accordance with the invention have $L_a$ values that are about 4 nm or greater, and in particular greater than about 4.5 nm, and in some embodiments greater than 5.0 nm. The data in Table 3 suggest that carbon fibers made in accordance with the invention tend to have larger $L_a$ values than conventional PAN-based carbon fibers made at comparable temperatures. The carbon fibers exemplified in Table 3 were prepared at carbonization temperatures of about 1,315° C. and have $L_a$ values that are higher than what would normally be expected at these relatively low carbonization temperatures. Conventional PAN-based fibers having comparable $L_a$ values are typically prepared with conventional techniques that heat the fibers above 1,750° C., and even above 2,000° C., e.g., high enough to induce graphitization in the carbon fibers. The carbon fibers exemplified in Table 3 were prepared at carbonization temperatures of about 1,315° C. and have $L_a$ values that are higher than what would normally be expected from PAN-based precursors processed at these relatively low carbonization temperatures. On the other hand, mesophase pitch-based precursors are known to exhibit high $L_a$ values at low carbonization temperatures. However, the higher $L_a$ values exhibited by mesophase pitch-based fibers are accompanied by lower tensile strength values. As noted above, the high $L_a$ values are consistent with the distinct striations noted on pertinent AFM phase images, and again point to the unique nature of carbon fibers prepared according to the invention. Carbon fibers prepared according to the present invention can provide a favorable balance between the need for highly oriented extended ribbons (to enhance modulus) along with crystalline domains of relatively small dimensions (to enhance strength).

In another embodiment, carbon fibers prepared in accordance with the invention can also be characterized by their resistivity. Fiber tow electrical resistivities were determined using a commercially available digital multimeter (GW Instek Model GDM-8055). The meter was connected to a fiber support frame designed to align tows for measuring the electrical resistance (R) across multiple 0.20 m segments of a continuous fiber. Average R values from 6-10 segments per sample were used to calculate electrical resistivities (r) using the following equation:

$$r = 5RW/\rho \quad (4)$$

where R (in Ohms) is the average measured electrical resistance, W (in g/m) is the fiber weight per unit length, WPUL, as listed in Tables 6-9, ρ (in g/cm³) is the fiber density (also listed in Tables 6-9); and r is calculated in units of μΩm.

As shown in Table 4, carbon fibers prepared in accordance with the invention have a relatively higher resistivity than what would normally be expected for fibers having similar modulus of elasticity. Conventional art methods to increase carbon fiber modulus (such as carbonizing the fibers above 1,500° C.) are generally accompanied by a decrease in electrical resistivity. While conventional processing methods lead to the expected decrease in resistivity with increasing modulus, the resistivity of the inventive carbon fibers remained relativity high (above 13 μΩm, and in some embodiments above 14 μΩm) at modulus of elasticity above about 50 Msi.

TABLE 4

Resistivity Data of Representative Carbon Fibers

| Example No. | Carbonization Temperature (° C.) | Strength (ksi) | Modulus (Msi) | Diameter (μm) | Density (g/cm³) | Resistivity (μΩm) |
|---|---|---|---|---|---|---|
| Comparative 1 | 1.315 | 932 | 42.7 | 4.3 | 1.797 | 13.0 |
| 31 | 1.315 | 893 | 43.5 | 3.5 | 1.806 | 14.3 |
| 32 | 1.315 | 972 | 47.8 | 3.5 | 1.832 | 14.3 |
| 33 | 1.315 | 1061 | 47.8 | 3.5 | 1.815 | 14.0 |
| 35 | 1.315 | 1107 | 52.2 | 3.6 | 1.806 | 14.2 |
| Comparative Resistivity Example 1 | >1500° C. | 500 | 64.1 | 4.5 | 1.880 | 8.7 |
| Comparative Resistivity Example 2 | >1500° C. | 732 | 55.1 | 5.0 | 1.768 | 11.3 |

In the Examples in Table 4 above, Comparative Example 1, Examples 31 through 33, and Example 35 were prepared according to the process described in Table 6 below. Comparative Resistivity Examples 1 and 2 represent conventional high modulus fibers prepared in general accordance with the process described for Comparative Example 1 in Table 6, except that they were carbonized at temperatures in excess of 1,500° C.

Further, carbon fibers prepared in accordance with the invention also have a more uniform distribution of crystallinity in a single filament. In one embodiment, carbon fibers of the present invention are characterized by having a difference in crystallinity "RD" between the inner and outer layers of each single filament that is less than about 0.05, and in particular less than about 0.015. RD can be determined using RAMAN analysis. An exemplary method of determining RD is described in U.S. Pat. No. 6,428,892, the contents of which are hereby incorporated to the extent that they are consistent with the teachings herein.

Carbon fibers having small or little structural difference between the inner and outer layers exhibit small differences in "RD" between the inner and outer layers. In one embodiment, the carbon fibers of the present invention exhibit a difference "RD" between the inner and outer from about 0.01 to 0.05, and more particularly between 0.01 and 0.025.

The crystalline uniformity of the inventive carbon fibers can also be characterized in terms of radial uniformity (RU) of the carbon fiber. As defined in this disclosure, the Radial Uniformity parameter "RU" provides a relative measure of strain distribution differences between the outer and inner layers of carbon fiber filaments. The derivation and the significance of RU values are outlined below.

Radial uniformity was evaluated with a Jobin-Yvon "LabRAM" Raman Spectrometer, equipped with a 1,800 gr/mm grating and excited by an $Ar^+$ ion laser beam (514.5 nm wavelength) focused with a ×100 objective lens. Sample filaments were mounted with their cross-sections oriented perpendicular to the direction of the laser beam. After securing the mounts against vibration sources, the laser beam was independently focused on two radial locations within selected filament cross-sections: (a) at the center of the filament, and (b) near the external surface of the filament. Inelastically scattered radiation intensity $I_c$ or $I_S$, respectively) was measured at high spectral resolution (at wavenumber increments of ~1 $cm^{-1}$) within lower and upper wavenumber boundaries determined by the shape of the Raman scattering peaks attributable to ordered and disordered carbon structures in the sample. Typical lower and upper boundaries for these peaks were about 700 $cm^{-1}$ or less and 2,220 $cm^{-1}$ or more, respectively. It should be noted that since the laser spot at the sample has a diameter of 1 micron, additional refinements may be required to extend this technique to filament diameters below 3 microns.

Radial Uniformity (RU) values are derived by noting that Raman peaks from carbonaceous materials in general, and carbon fibers in particular, represent the combined response of a multitude of bonds stressed to different degrees. Hence, the positions and shapes of the Raman peaks vary in relation to the amount of strain experienced by the bonds contained within the region probed. Raman spectra of carbon fibers generally exhibit two broad peaks: one with maximum intensity at about 1,560-1,600 $cm^{-1}$, associated with ordered structures akin to graphite (G band), and another one with maximum intensity at about 1,330-1,370 $cm^{-1}$, associated with disordered structures (D band). These two broad peaks overlap to an extent determined by their relative distribution of bond stresses. Parameter RU quantifies this extent on the basis of Raman intensities at frequencies representative of the average degree of strain within ordered ($Y_g$) and disordered ($Y_d$) regions of a given sample. Noting that the difference between Raman intensity ratios $Y_d/Y_g$ measured at the outer (or skin) layers versus the inner (or core (layers) is inversely proportional to radial uniformity, it follows that parameter RU can be calculated as:

$$RU = ((I_{s,g} - I^b_{s,g})(I_{c,g} - I^b_{c,g}))/((I_{s,d} - I^b_{s,d})(I_{c,g} - I^b_{c,g}) - (I_{s,g} - I^b_{s,g})(I_{c,d} - I^b_{c,d})) \quad (5)$$

In Equation 5, Raman intensities I are taken directly from raw data (in order to avoid biases due to curve-fitted baseline corrections), subscripts s and c refer to the skin and core regions of a filament cross-section, respectively, subscripts g and d refer to the ordered and disordered regions as defined above, respectively, and superscript b refer to baseline values derived from the raw data plots. For the purposes of this application, intensities $I_g$ and $I_d$ are associated with intensity values generally within 1,560-1,600 $cm^{-1}$ and 1,460-1,500 $cm^{-1}$, respectively. RU values calculated according to Equation 5 are directly proportional to radial uniformity, and are very sensitive to small differences in radial strain distributions, as provided by the fibers of this invention.

Representative examples of RU values for carbon fibers of the invention are detailed in Table 5 below. The examples in Table 5 correspond to the examples in Table 6 below. Generally, carbon fibers in accordance with the invention have relatively high RU values. In one embodiment, the carbon fibers have an RU value of about 50 or greater, and in particular about 75 or greater. In some embodiments, the carbon fibers may have an RU value of about 100 or greater. In one embodiment, the invention comprises carbon fibers having a tensile strength of at least 975 ksi, a modulus of elasticity of at least 46 Msi and an RU value of about 50 or greater.

TABLE 5

Radial Uniformity of Representative Carbon Fibers

| Example No. | Strength [ksi] | Modulus [Msi] | Diameter (μm) | Density (g/cm³) | RU |
|---|---|---|---|---|---|
| Comparative Example 1 | 932 | 42.7 | 4.3 | 1.797 | 22 |
| Comparative Example 3 | 982 | 44.9 | 4.3 | 1.809 | 29 |
| 23 | 1012 | 46.0 | 3.6 | 1.805 | 91 |
| 29 | 1113 | 51.5 | 3.6 | 1.809 | 1000 |
| 60 | 977 | 47.1 | 3.5 | 1.815 | 59 |

The crystallinity difference between the inner and outer layers of single fiber is generally believed to be a function of the ability of oxygen to diffuse into the fibers during stabilization. As discussed above, the present invention provides for better control and more uniform oxidation of the PAN fibers during oxidation, and hence results in a more uniform distribution of crystallinity between the inner and outer portions of the carbon fibers. Generally, the crystallinity difference between the inner and outer layers increases as the thickness of the fibers increases. In the present invention, controlled stretching helps to thin the individual filaments, which in turn, permits more uniform, diffusion of oxygen into the fibers. As a result, the distribution of crystallinity in the fibers is also more uniform. According to the invention, carbon fibers having reduced areas of tensile stress concentration can be produced. Higher crystallinity near the outer layers of the carbon fibers may result in points of high tensile stress that can result in breakage or damage to the carbon fibers, which results in carbon fibers of lower tensile strength.

Carbon fibers prepared according to the invention can also provide a variety of strain values when loaded to failure. In particular, strain-to-failure values approaching 2.5% have been measured from fibers that would exhibit about 2% strain-to-failure when made following prior art methods.

Carbon fibers made according to the present invention also provide distinct benefits for composite manufacture. Since the invention provides a method of obtaining carbon fibers having relatively high modulus at relatively low carbonization temperatures, the surfaces of the carbon fibers can remain reactive. This fact enables milder surface treatments and a more effective interaction with composite resins for improved mechanical property translation. Low carbonization temperatures can also be beneficial towards enhancing compressive strength. In addition, the present invention can be used to prepare carbon fibers having relatively small diameters, which can provide benefits in terms of (a) reductions in filament rigidity for improved tow moldability; and (b) the increased specific surface area for fiber-resin contact. This increased specific surface area, coupled with an enhanced phase angle roughness as revealed by AFM analysis, may help improve chemical bonding mechanical interlocking between the fibers and the resin.

The following Examples are provided for illustrating aspects of the invention and should not be construed as limiting the invention. Unless otherwise indicated all modulus of elasticity measurements cited in the Examples were made according to ASTM D 4018, as described in more detail in U.S. Pat. No. 5,004,590, the contents of which are hereby incorporated by reference. Fiber modulus values refer to tensile chord moduli of resin-impregnated tow strands determined between lower and upper strain limits of 0.1% and 0.6%, respectively. Moreover, tensile strengths were measured according to ASTM D 4018, as described in more detail in U.S. Pat. No. 5,004,590, the contents of which are hereby incorporated by reference.

EXAMPLES

In the examples listed in Tables 6-8, polyacrylonitrile (PAN) precursor fibers were made from a copolymer consisting of 98 mol % acrylonitrile and 2 mol % methacrylic acid by an air gap wet spinning process. The starting copolymer had an intrinsic viscosity of about 2.0 deciliters per gram when determined using concentrated sodium thiocyanate as the solvent. In the examples in Table 9, PAN precursor fibers were made from a terpolymer consisting of 93.0 mol % acrylonitrile, 1.5 mol % itaconic acid and 5.5 mol % methyl acrylate by a wet spinning process. In all the examples, the spinning and coagulant solutions were based on aqueous sodium thiocyanate. The fibers were stretched during spinning so that their length in tow form became up to about six times greater after steam stretching compared to their length after extrusion from the spinnerettes. The dried precursor fibers contained about 1 wt. % of a silicone-based finish oil, and had filament deniers of 0.60 (Table 6), 0.8 (Table 7), 1.33 (Table 8) and 1.53 (Table 9) dpf. Tables 6-9 list results for fibers with filament counts between 6,000 and 24,000 filaments per tow.

The precursor fibers were stabilized by passing them through a series of forced air convection ovens generally held at increasing oxidation temperatures (exceptions are noted in the footnotes in Tables 6-9). The first oven was configured to enable controlled stretching or shrinkage in multiple passes, as illustrated in FIG. 2. In the following examples, four passes with external roll assemblies were employed. Each roll assembly included its own individual motor and multiple rolls coupled by gears in order to increase the contact between the fiber and the surface of the rolls. The first driven roll assembly advanced the fibers through the oven and onto an idler roll connected to a load cell. The fibers made a 180 degree turn at the load cell idler roll and returned to the oven towards a second driven roll assembly. The second roll assembly was generally driven at a speed higher than the first assembly, so the effective % stretch in the first pass was correspondingly higher. Speeds in subsequent roll assemblies were adjusted so that the effective % stretches experienced by the fibers in the subsequent passes were also varied.

The information provided in Tables 6-9 may be best understood by referring to Example 35 in Table 6 for illustration. In Example 35 the second roll assembly was driven at a speed 20% higher than the first assembly, so the effective % stretch in the first pass Table 6) was 20.0%. Speeds in subsequent roll assemblies were adjusted so that the effective % stretches experienced by the fibers in three additional passes were 13.3% (#2), 10.3% (#3) and 6.70% (#4). Hence, the overall cumulative % stretch (OX-Str) experienced by this fiber within the first oxidation oven was 60.0%. During controlled stretching the first oxidation oven was maintained at a temperature (Temp Ox.) of 223° C. Following the controlled stretching of the fibers, the fibers were advanced at 0% additional stretch through three more oxidation ovens maintained at incrementally higher temperatures up to 246° C. The overall residence time in all four of the oxidation ovens was less than 90 minutes. Other Examples cover a broad range of experimental parameters, as indicated in footnotes to the Tables and discussed in more detail below.

The stabilized fibers from Example 35 were then advanced through low and high temperature furnaces having average temperatures of 523° C. and 1,315° C., respectively. In some of the following examples, the high temperature furnace was operated at higher temperatures, e.g., 1,500° C. or higher. In Example 35 the inlet and outlet speeds of the fibers through these carbonization furnaces were set to deliver effective % stretches in the low and high temperature furnaces of 21.1% and −3.5% (shrinkage), respectively, by means of isolation rollers. In other Examples, the degrees of stretch in the low temperature furnace and of shrinkage in the high temperature furnace were modified as listed in Tables 6-9. Unless noted otherwise, the total residence time in the carbonization zones was about one tenth of that in the oxidative stabilization portions of the process.

After completion of the carbonization step in Example 35, the fiber was surface treated by subjecting it to anodic oxidation in an ammonium bicarbonate bath with a charge of 90 Coulombs per square meter. The surface treated fiber was sized with an epoxy-compatible sizing agent, and was dried and wound in spools prior to testing or further processing to form a composite. In the case of Example 35, sufficient quantities of carbon fiber were made to produce a 6-inch resin-impregnated prepreg tape and test its properties. The determination of interlaminar or short beam shear strength by a Laminate test described in U.S. Pat. No. 5,004,590, which has previously been incorporated by reference, indicated that the composite had a short beam shear strength of 19.0 ksi.

The effects and resulting fiber properties of controlled stretching in the oxidation oven were investigated for four different types of fibers. The following examples were prepared on a research pilot line over an extended period. During that period, mechanical changes were made to improve the performance of the line and in particular to reduce tension variability arising from various sources. Reduction in tension variability to minimum levels can be achieved by methods known in the field of fiber technology, including the use of slip-free rolls and vibration-damping devices. Some experimental variability in the results is to be expected, with typical coefficients of variation being within 2-3%. However, the apparent variability in some of the examples in the Tables is more a reflection of their being listed in order of increasing oxidation stretch severity, as opposed to increasing chronological order or experimental test set. Pertinent footnotes in each Table account for these and other deviations from the standard norm.

The results are summarized in the following Tables.

1) Table 6: The Examples in Table 6 were prepared using PAN precursor fibers (AN:MAA) having a denier of 0.60 dpf and a fiber diameter of 8.5 μm.

2) Table 7: The Examples in Table 7 were prepared using PAN precursor fibers (AN:MAA) having a denier of 0.80 dpf and a fiber diameter of 9.8 μm.

3) Table 8: The Examples in Table 8 were prepared using PAN precursor fibers (AN:MAA) having a denier of 1.33 dpf and a fiber diameter of 12.6 μm.

4) Table 9: The Examples in Table 9 were prepared using PAN precursor fibers (AN:IA:MA) having a denier of 1.53 dpf and a fiber diameter of 13.5 μm.

In Tables 6 through 9 the following column headings are defined as follows:

a) "% Stretch in OX-Pass #" refers to the % stretch between successive drive rolls;

b) "OX-Str. (%)" refers to the cumulative % stretch of the fiber in the oxidation oven;

c) "Temp. OX (° C.)" refers to the temperature of the oxidation oven;

d) "TR-Str. (%)" refers to % stretch in the low temperature furnace (also referred to as the tar remover furnace);

e) "Temp.TR (° C.)" refers to the temperature in the low temperature furnace;

f) "C2-Str. (%)" refers to the % stretch in the high temperature furnace (also referred to as the carbonization furnace);

g) "HTT (° C.)" refers to the temperature in the high temperature furnace;

h) "WPUL" refers to the weight per unit length of the carbon fiber;

i) "Density" refers to the density of the carbon fiber;

j) "Diameter" refers to the average diameter of the carbon fiber filaments, calculated from the fiber WPUL and density; and k) "Strength" and "Modulus" are as defined above.

TABLE 6

Processing Conditions and Property Data for Carbon Fibers prepared from PAN precursor fibers having a denier of 0.60 dpf

| Example No. | % Stretch in OX-Pass # 1 | 2 | 3 | 4 | OX-Str. (%) | Temp. OX (° C.) | TR-Str. (%) | Temp. TR (° C.) | C2-Str. (%) | HTT (° C.) | WPUL (g/m) | Density (g/cm³) | Diameter (μm) | Strength (ksi) | Modulus (Msi) |
|---|---|---|---|---|---|---|---|---|---|---|---|---|---|---|---|
| Comparative 1 | 15 | 0 | 0 | 0 | 15 | 223 | 12 | 523 | −3.5 | 1315 | 0.317 | 1.797 | 4.3 | 932 | 42.7 |
| Comparative 2[a,b] | 15 | 0 | 0 | 0 | 15 | 223 | 12 | 523 | −3.5 | 1315 | 0.319 | 1.829 | 4.3 | 965 | 41.1 |
| Comparative 3[b] | 15 | 0 | 0 | 0 | 15 | 223 | 12 | 523 | −3.5 | 1315 | 0.319 | 1.809 | 4.3 | 982 | 44.9 |
| Comparative 4[b] | 15 | 0 | 0 | 0 | 15 | 223 | 12 | 523 | −3.5 | 1315 | 0.319 | 1.829 | 4.3 | 1047 | 40.3 |
| Comparative 5[b,c] | 15 | 0 | 0 | 0 | 15 | 223 | 12 | 523 | −3.5 | 1315 | 0.155 | 1.802 | 4.3 | 1079 | 41.5 |
| Comparative 6 | 15 | 0 | 0 | 0 | 15 | 223 | 12 | 523 | −3.5 | 1315 | 0.320 | 1.806 | 4.3 | 975 | 41.2 |
| Comparative 7 | 20 | 0 | 0 | 0 | 20 | 223 | 12 | 523 | −3.5 | 1315 | 0.304 | 1.800 | 4.2 | 991 | 40.9 |
| Comparative 8 | 48 | 0 | 0 | 0 | 48 | 223 | 12 | 523 | −3.5 | 1315 | 0.244 | 1.808 | 3.8 | 979 | 44.7 |
| Comparative 9 | 48 | 0 | 0 | 0 | 48 | 223 | 24 | 523 | −3.5 | 1315 | 0.230 | 1.808 | 3.7 | 930 | 42.4 |
| Comparative 10 | 60 | 0 | 0 | 0 | 60 | 223 | 24 | 523 | −3.5 | 1315 | 0.225 | 1.812 | 3.6 | 882 | 47.4 |
| 1 | 0 | 0 | 0 | 15 | 15 | 223 | 12 | 523 | −3.5 | 1315 | 0.323 | 1.799 | 4.4 | 1026 | 39.9 |
| 2 | 3.6 | 3.6 | 3.6 | 3.6 | 15 | 223 | 12 | 523 | −3.5 | 1315 | 0.328 | 1.799 | 4.4 | 939 | 38.8 |
| 3 | 5 | 5 | 4.3 | 0 | 15 | 223 | 12 | 523 | −3.5 | 1315 | 0.321 | 1.808 | 4.3 | 956 | 41.8 |
| 4 | 10 | 4.6 | 0 | 0 | 15 | 223 | 12 | 523 | −3.5 | 1315 | 0.318 | 1.808 | 4.3 | 941 | 40.5 |
| 5 | 20 | −4.2 | 0 | 0 | 15 | 223 | 12 | 523 | −3.5 | 1315 | 0.319 | 1.803 | 4.3 | 995 | 41.0 |
| 6 | 5 | 5 | 4.3 | 4.3 | 20 | 223 | 12 | 523 | −3.5 | 1315 | 0.308 | 1.807 | 4.3 | 914 | 42.2 |
| 7 | 5 | 5.5 | 6 | 6.5 | 25 | 223 | 12 | 523 | −3.5 | 1315 | 0.297 | 1.806 | 4.2 | 903 | 40.7 |
| 8 | 5 | 7 | 8 | 9 | 32.3 | 223 | 12 | 523 | −3.5 | 1315 | 0.281 | 1.809 | 4.1 | 921 | 39.9 |
| 9 | 5 | 9 | 10 | 11.2 | 40 | 223 | 12 | 523 | −3.5 | 1315 | 0.266 | 1.803 | 4.0 | 1006 | 43.3 |
| 10 | 5 | 9 | 10 | 11.2 | 40 | 223 | 16 | 523 | −3.5 | 1315 | 0.245 | 1.815 | 3.8 | 966 | 44.8 |
| 11 | 5 | 9 | 10 | 11.2 | 40 | 223 | 16 | 523 | −3.5 | 1425 | 0.255 | 1.777 | 3.9 | 953 | 45.7 |
| 12 | 5 | 9 | 10 | 11.2 | 40 | 223 | 16 | 523 | −3.4 | 1425 | 0.245 | 1.810 | 3.8 | 980 | 44.5 |
| 13 | 5 | 9 | 10 | 11.2 | 40 | 223 | 16 | 523 | −3.2 | 1425 | 0.221 | 1.819 | 3.6 | 1078 | 48.9 |
| 14 | 5 | 9 | 10 | 11.2 | 40 | 223 | 24 | 523 | −3.5 | 1315 | 0.220 | 1.795 | 3.6 | 1166 | 48.3 |
| 15 | 10 | 9.2 | 8.2 | 7.7 | 40 | 223 | 12 | 523 | −3.5 | 1315 | 0.262 | 1.803 | 3.9 | 994 | 43.4 |
| 16 | 15 | 8.7 | 6.4 | 5.3 | 40 | 223 | 12 | 523 | −3.5 | 1315 | 0.261 | 1.806 | 3.9 | 1008 | 44.3 |
| 17 | 15 | 8.7 | 6.4 | 5.3 | 40 | 223 | 16 | 523 | −3.5 | 1425 | 0.250 | 1.777 | 3.9 | 965 | 45.7 |
| 18 | 15 | 8.7 | 6.4 | 5.3 | 40 | 223 | 24 | 523 | −3.4 | 1425 | 0.232 | 1.780 | 3.7 | 955 | 47.3 |
| 19 | 20 | 15 | 3 | 2 | 45 | 223 | 21 | 523 | −3.5 | 1315 | 0.348 | 1.798 | 4.5 | 947 | 43.6 |
| 20 | 20 | 15 | 3 | 2 | 45 | 223 | 12 | 523 | −3.5 | 1315 | 0.349 | 1.800 | 4.5 | 1040 | 47.9 |
| 21 | 12.5 | 11.1 | 10 | 9.1 | 50 | 223 | 12 | 523 | −3.5 | 1315 | 0.244 | 1.798 | 3.8 | 963 | 43.9 |

TABLE 6-continued

Processing Conditions and Property Data for Carbon Fibers prepared from PAN precursor fibers having a denier of 0.60 dpf

| Example No. | % Stretch in OX-Pass # 1 | 2 | 3 | 4 | OX-Str. (%) | Temp. OX (°C.) | TR-Str. (%) | Temp. TR (°C.) | C2-Str. (%) | HTT (°C.) | WPUL (g/m) | Density (g/cm³) | Diameter (μm) | Strength (ksi) | Modulus (Msi) |
|---|---|---|---|---|---|---|---|---|---|---|---|---|---|---|---|
| 22 | 15 | 11.3 | 9.4 | 7.1 | 50 | 223 | 12 | 523 | −3.5 | 1315 | 0.246 | 1.803 | 3.8 | 997 | 44.6 |
| 23 | 15 | 11.3 | 9.4 | 7.1 | 50 | 223 | 24 | 523 | −3.5 | 1315 | 0.220 | 1.805 | 3.6 | 1012 | 46.0 |
| 24 | 15 | 11.3 | 9.4 | 7.1 | 50 | 223 | 24 | 523 | −3.5 | 1425 | 0.219 | 1.780 | 3.6 | 999 | 47.1 |
| 25 | 25 | 20 | 0 | 0 | 50 | 223 | 18 | 523 | −3.5 | 1315 | 0.229 | 1.808 | 3.7 | 1016 | 45.2 |
| 26 | 25 | 20 | 0 | 0 | 50 | 223 | 24 | 523 | −3.5 | 1315 | 0.218 | 1.809 | 3.6 | 972 | 46.0 |
| 27 [h] | 20 | 13.3 | 10.3 | 6.7 | 60 | 223 | 12 | 523 | −3.5 | 1315 | 0.228 | 1.801 | 3.7 | 970 | 44.6 |
| 28 | 20 | 13.3 | 10.3 | 6.7 | 60 | 223 | 18 | 523 | −3.5 | 1315 | 0.218 | 1.804 | 3.6 | 979 | 45.5 |
| 29 [g] | 20 | 13.3 | 10.3 | 6.7 | 60 | 223 | 21 | 523 | −3.5 | 1315 | 0.218 | 1.809 | 3.6 | 1113 | 51.5 |
| 30 [h] | 20 | 13.3 | 10.3 | 6.7 | 60 | 223 | 21 | 523 | −3.5 | 1315 | 0.212 | 1.807 | 3.5 | 1008 | 46.8 |
| 31 [d] | 20 | 13.3 | 10.3 | 6.7 | 60 | 223 | 21 | 523 | −3.5 | 1315 | 0.211 | 1.806 | 3.5 | 893 | 43.5 |
| 32 [e] | 20 | 13.3 | 10.3 | 6.7 | 60 | 223 | 21 | 523 | −3.5 | 1315 | 0.210 | 1.832 | 3.5 | 1061 | 47.8 |
| 33 [f] | 20 | 13.3 | 10.3 | 6.7 | 60 | 223 | 21 | 523 | −3.5 | 1315 | 0.213 | 1.815 | 3.5 | 972 | 47.8 |
| 34 [g] | 20 | 13.3 | 10.3 | 6.7 | 60 | 223 | 21 | 523 | −3.5 | 1315 | 0.212 | 1.817 | 3.5 | 1058 | 47.3 |
| 35 [b,g] | 20 | 13.3 | 10.3 | 6.7 | 60 | 223 | 21 | 523 | −3.5 | 1315 | 0.218 | 1.806 | 3.6 | 1107 | 52.2 |
| 36 [h] | 20 | 13.3 | 10.3 | 6.7 | 60 | 223 | 24 | 523 | −3.5 | 1315 | 0.206 | 1.807 | 3.5 | 1014 | 45.9 |
| 37 | 20 | 13.3 | 10.3 | 6.7 | 60 | 223 | 24 | 523 | −3.5 | 1315 | 0.191 | 1.809 | 3.4 | 1073 | 50.0 |
| 38 [b] | 20 | 13.3 | 10.3 | 6.7 | 60 | 223 | 24 | 523 | −3.5 | 1315 | 0.206 | 1.801 | 3.5 | 1141 | 53.3 |
| 39 | 25 | 20 | 4 | 2.6 | 60 | 223 | 24 | 523 | −3.5 | 1315 | 0.204 | 1.808 | 3.5 | 984 | 46.7 |
| 40 | 25 | 20 | 4 | 2.6 | 60 | 223 | 24 | 523 | −3.5 | 1425 | 0.204 | 1.782 | 3.5 | 963 | 46.9 |
| 41 | 25 | 24 | 2 | 1.2 | 60 | 223 | 24 | 523 | −3.5 | 1315 | 0.205 | 1.810 | 3.5 | 980 | 46.5 |
| 42 | 25 | 24 | 2 | 1.2 | 60 | 223 | 21 | 523 | −3.5 | 1315 | 0.211 | 1.807 | 3.5 | 960 | 45.2 |
| 43 | 25 | 24 | 2 | 1.2 | 60 | 223 | 21 | 523 | −3.5 | 1425 | 0.209 | 1.784 | 3.5 | 957 | 46.6 |
| 44 | 25 | 24 | 2 | 1.2 | 60 | 223 | 21 | 523 | −3.5 | 1525 | 0.206 | 1.765 | 3.5 | 926 | 47.9 |
| 45 | 25 | 24 | 2 | 1.2 | 60 | 223 | 21 | 523 | −3.5 | 1695 | 0.203 | 1.749 | 3.5 | 842 | 50.0 |
| 46 | 25 | 20 | 4 | 2.6 | 60 | 223 | 21 | 523 | −3.5 | 1315 | 0.209 | 1.811 | 3.5 | 953 | 45.0 |
| 47 | 25 | 20 | 4 | 2.6 | 60 | 223 | 21 | 523 | −3.5 | 1420 | 0.206 | 1.782 | 3.5 | 915 | 45.5 |
| 48 | 25 | 20 | 4 | 2.6 | 60 | 223 | 21 | 523 | −3.5 | 1520 | 0.203 | 1.765 | 3.5 | 910 | 46.7 |
| 49 | 25 | 20 | 4 | 2.6 | 60 | 223 | 21 | 523 | −3.5 | 1610 | 0.202 | 1.757 | 3.5 | 878 | 49.0 |
| 50 | 25 | 20 | 4 | 2.6 | 60 | 223 | 21 | 523 | −3.5 | 1690 | 0.202 | 1.761 | 3.5 | 865 | 50.3 |
| 51 | 25 | 20 | 4 | 2.6 | 60 | 223 | 21 | 523 | −3.5 | 1790 | 0.201 | 1.746 | 3.5 | 836 | 51.9 |
| 52 | 25 | 20 | 4 | 2.6 | 60 | 223 | 21 | 523 | −3.5 | 1890 | 0.199 | 1.759 | 3.5 | 861 | 54.9 |
| 53 | 25 | 20 | 4 | 2.6 | 60 | 223 | 21 | 523 | −3.5 | 1980 | 0.199 | 1.764 | 3.5 | 856 | 58.0 |
| 54 | 25 | 20 | 4 | 2.6 | 60 | 223 | 12 | 523 | −3.5 | 1315 | 0.227 | 1.805 | 3.7 | 974 | 44.3 |
| 55 | 25 | 20 | 4 | 2.6 | 60 | 223 | 24 | 523 | −3.5 | 1315 | 0.206 | 1.817 | 3.5 | 977 | 48.3 |
| 56 | 25 | 20 | 4 | 2.6 | 60 | 223 | 24 | 523 | −3.3 | 1420 | 0.201 | 1.786 | 3.5 | 951 | 48.3 |
| 57 | 25 | 20 | 4 | 2.6 | 60 | 223 | 21 | 523 | −3.3 | 1690 | 0.196 | 1.748 | 3.5 | 822 | 51.7 |
| 58 | 25 | 25 | 4.3 | 1.2 | 65 | 223 | 24 | 523 | −3.5 | 1315 | 0.199 | 1.809 | 3.4 | 974 | 45.9 |
| 59 | 25 | 20 | 9.3 | 6.7 | 70 | 223 | 18 | 523 | −3.5 | 1315 | 0.193 | 1.806 | 3.4 | 1010 | 47.2 |
| 60 | 30 | 23 | 4 | 2 | 70 | 223 | 18 | 523 | −3.5 | 1315 | 0.204 | 1.815 | 3.5 | 977 | 47.1 |
| 61 | 30 | 23 | 4 | 2 | 70 | 223 | 24 | 523 | −3.5 | 1315 | 0.200 | 1.812 | 3.4 | 1002 | 49.0 |

[a] Improved equipment components.
[b] Reduced tension variability.
[c] 6,000 (vs. 12,000) filaments per tow.
[d] Run excluding surface treatment and sizing application (blank run).
[e] Including surface treatment but no sizing.
[f] Including sizing but unstable emulsion.
[g] Including surface treatment and sizing.
[h] Relatively high tension variability during carbonization.

TABLE 7

Processing Conditions and Property Data for Carbon Fibers prepared from PAN precursor fibers having a denier of 0.80 dpf

| Example No. | % Stretch in OX-Pass # 1 | 2 | 3 | 4 | OX-Str. (%) | Temp. OX (°C.) | TR-Str. (%) | Temp. TR (°C.) | C2-Str. (%) | HTT (°C.) | WPUL (g/m) | Density (g/cm³) | Diameter (μm) | Strength (ksi) | Modulus (Msi) |
|---|---|---|---|---|---|---|---|---|---|---|---|---|---|---|---|
| Comparative 2.1 | 0 | 0 | 0 | 0 | 0 | 223 | 0 | 523 | −4.1 | 1315 | 0.570 | 1.776 | 5.84 | 762 | 38.1 |
| Comparative 2.2 | 9.1 | 0 | 0 | 0 | 9.1 | 223 | 12 | 523 | −3.5 | 1315 | 0.460 | 1.784 | 5.23 | 844 | 41.2 |
| Comparative 2.3 | 24 | 0 | 0 | 0 | 24 | 223 | 24 | 523 | −3.5 | 1315 | 0.357 | 1.805 | 4.58 | 879 | 41.7 |
| Comparative 2.4 | 30 | 0 | 0 | 0 | 30 | 223 | 24 | 523 | −3.5 | 1315 | 0.342 | 1.802 | 4.49 | 859 | 44.8 |
| Comparative 2.5 | 50 | 0 | 0 | 0 | 50 | 223 | 24 | 523 | −3.5 | 1315 | 0.295 | 1.803 | 4.17 | 880 | 44.5 |

TABLE 7-continued

Processing Conditions and Property Data for Carbon Fibers prepared from PAN precursor fibers having a denier of 0.80 dpf

| Example No. | % Stretch in OX-Pass # 1 | 2 | 3 | 4 | OX-Str. (%) | Temp. OX (° C.) | TR-Str. (%) | Temp. TR (° C.) | C2-Str. (%) | HTT (° C.) | WPUL (g/m) | Density (g/cm³) | Diameter (μm) | Strength (ksi) | Modulus (Msi) |
|---|---|---|---|---|---|---|---|---|---|---|---|---|---|---|---|
| 2.6 | 9.1 | 10 | 0 | 0 | 20 | 223 | 12 | 523 | −3.5 | 1315 | 0.408 | 1.794 | 4.91 | 872 | 41.9 |
| 2.7 | 9.1 | 10 | 6.7 | 0 | 28 | 223 | 12 | 523 | −3.5 | 1315 | 0.383 | 1.793 | 4.76 | 898 | 41.2 |
| 2.8 | 9.1 | 10 | 6.7 | 5.5 | 35 | 223 | 12 | 523 | −3.5 | 1315 | 0.364 | 1.793 | 4.64 | 894 | 42.4 |
| 2.9 | 20 | 20 | 0 | 0 | 44 | 223 | 24 | 523 | −3.5 | 1315 | 0.310 | 1.798 | 4.28 | 915 | 41.5 |
| 2.10 [a] | 20 | 20 | 0 | 0 | 44 | 223 | 24 | 523 | −3.5 | 1315 | 0.308 | 1.796 | 4.26 | 892 | 41.2 |
| 2.11 [b] | 20 | 20 | 0 | 0 | 44 | 223 | 24 | 523 | −3.5 | 1315 | 0.303 | 1.805 | 4.22 | 864 | 40.5 |
| 2.12 [b] | 20 | 20 | 0 | 0 | 44 | 223 | 30 | 523 | −3.5 | 1315 | 0.287 | 1.805 | 4.11 | 839 | 44.5 |
| 2.13 [b,c] | 20 | 20 | 0 | 0 | 44 | 223 | 24 | 523 | −3.5 | 1315 | 0.301 | 1.794 | 4.22 | 892 | 43.3 |
| 2.14 [b,c] | 20 | 20 | 0 | 0 | 44 | 223 | 30 | 523 | −3.5 | 1315 | 0.285 | 1.814 | 4.08 | 858 | 45.3 |
| 2.15 [b,c] | 20 | 20 | 0 | 0 | 44 | 223 | 33 | 523 | −3.5 | 1315 | 0.288 | 1.807 | 4.11 | 791 | 45.4 |
| 2.16 | 15 | 15 | 7 | 6 | 50 | 210 | 24 | 523 | −3.5 | 1315 | 0.301 | 1.796 | 4.22 | 877 | 44.5 |
| 2.17 | 15 | 15 | 7 | 6 | 50 | 223 | 24 | 523 | −3.5 | 1315 | 0.303 | 1.795 | 4.23 | 906 | 44.9 |
| 2.18 | 15 | 15 | 7 | 6 | 50 | 236 | 24 | 523 | −3.5 | 1315 | 0.303 | 1.792 | 4.24 | 893 | 45.0 |
| 2.19 | 15 | 15 | 7 | 6 | 50 | 249 | 24 | 523 | −3.5 | 1315 | 0.310 | 1.788 | 4.29 | 689 | 44.2 |
| 2.20 [d] | 15 | 15 | 7 | 6 | 50 | 236 | 24 | 523 | −3.5 | 1315 | 0.306 | 1.797 | 4.25 | 888 | 44.7 |
| 2.21 | 20 | 20 | 10 | −5.3 | 50 | 223 | 24 | 523 | −3.5 | 1315 | 0.300 | 1.799 | 4.20 | 884 | 44.7 |
| 2.22 | 20 | 25 | 10 | −9.1 | 50 | 223 | 24 | 523 | −3.5 | 1315 | 0.299 | 1.797 | 4.20 | 870 | 45.5 |
| 2.23 [c] | 20 | 20 | 10 | −5.3 | 50 | 223 | 24 | 523 | −3.5 | 1315 | 0.300 | 1.800 | 4.20 | 894 | 47.0 |
| 2.24 [e] | 20 | 20 | 10 | −5.3 | 50 | 223 | 24 | 523 | −3.5 | 1315 | 0.402 | 1.618 | 5.14 | 198 | 8.4 |
| 2.25 | 24 | 24 | 0 | 0 | 54 | 223 | 24 | 523 | −3.5 | 1315 | 0.290 | 1.805 | 4.13 | 883 | 43.2 |
| 2.26 | 24 | 24 | 0 | 0 | 54 | 223 | 28 | 523 | −3.5 | 1315 | 0.283 | 1.794 | 4.09 | 872 | 43.5 |
| 2.27 | 25 | 28 | 0 | 0 | 60 | 223 | 24 | 523 | −3.5 | 1315 | 0.271 | 1.802 | 3.99 | 901 | 44.5 |
| 2.28 [b] | 25 | 28 | 0 | 0 | 60 | 223 | 24 | 523 | −3.5 | 1315 | 0.270 | 1.807 | 3.98 | 820 | 44.8 |
| 2.29 [b,c] | 25 | 28 | 0 | 0 | 60 | 223 | 24 | 523 | −3.5 | 1315 | 0.273 | 1.807 | 4.00 | 795 | 46.8 |
| 2.30 [b,c] | 24 | 24 | 2 | 2 | 60 | 223 | 24 | 523 | −3.5 | 1315 | 0.270 | 1.804 | 3.98 | 879 | 45.0 |
| 2.31 [b,c] | 24 | 24 | 2 | 2 | 60 | 223 | 29 | 523 | −3.5 | 1315 | 0.259 | 1.822 | 3.88 | 836 | 43.6 |
| 2.32 [b,c] | 24 | 24 | 2 | 2 | 60 | 223 | 34 | 523 | −3.5 | 1315 | 0.251 | 1.817 | 3.83 | 809 | 47.2 |
| 2.33 [b,c] | 24 | 24 | 2 | 2 | 60 | 223 | 33 | 523 | −3.5 | 1315 | 0.251 | 1.817 | 3.83 | 822 | 46.3 |
| 2.34 | 24 | 24 | 4.1 | 0 | 60 | 223 | 24 | 523 | −3.5 | 1315 | 0.279 | 1.803 | 4.05 | 888 | 43.1 |
| 2.35 | 24 | 24 | 4.1 | 0 | 60 | 223 | 28 | 523 | −3.5 | 1315 | 0.253 | 1.812 | 3.92 | 887 | 43.0 |
| 2.36 | 25 | 28 | 0 | 0 | 60 | 223 | 24 | 523 | −3.5 | 1315 | 0.273 | 1.813 | 4.00 | 903 | 44.7 |
| 2.37 | 25 | 30 | 0 | 0 | 63 | 223 | 24 | 523 | −3.5 | 1315 | 0.275 | 1.798 | 4.03 | 833 | 45.0 |
| 2.38 | 25 | 30 | 0 | 0 | 63 | 223 | 28 | 523 | −3.5 | 1315 | 0.268 | 1.801 | 3.97 | 860 | 45.8 |
| 2.39 [c] | 25 | 30 | 0 | 0 | 63 | 223 | 24 | 523 | −3.5 | 1315 | 0.259 | 1.797 | 3.91 | 942 | 46.9 |
| 2.40 | 24 | 24 | 4.1 | 3.8 | 66 | 223 | 28 | 523 | −3.5 | 1315 | 0.261 | 1.796 | 3.92 | 861 | 44.6 |
| 2.41 | 24 | 24 | 4.1 | 3.8 | 66 | 223 | 24 | 523 | −3.5 | 1315 | 0.271 | 1.802 | 4.00 | 843 | 43.1 |
| 2.42 | 24 | 24 | 8 | 0 | 66 | 223 | 24 | 523 | −3.5 | 1315 | 0.269 | 1.800 | 3.98 | 901 | 43.2 |
| 2.43 | 24 | 24 | 8 | 0 | 66 | 223 | 28 | 523 | −3.5 | 1315 | 0.261 | 1.799 | 3.96 | 735 | 40.3 |
| 2.44 | 25 | 30 | 4.5 | 3.1 | 75 | 223 | 28 | 523 | −3.5 | 1315 | 0.248 | 1.802 | 3.82 | 877 | 47.5 |
| 2.45 | 25 | 30 | 4.5 | 3.1 | 75 | 223 | 28 | 523 | −3.5 | 1315 | 0.246 | 1.798 | 3.81 | 872 | 46.3 |
| 2.46 | 25 | 30 | 7.6 | 3 | 80 | 223 | 24 | 523 | −3.5 | 1315 | 0.240 | 1.800 | 3.76 | 876 | 45.1 |
| 2.47 | 25 | 30 | 7.6 | 3 | 80 | 223 | 24 | 523 | −3.5 | 1315 | 0.240 | 1.800 | 3.76 | 874 | 45.4 |
| 2.48 | 32 | 32 | 2.2 | 1.1 | 80 | 223 | 24 | 523 | −3.5 | 1315 | 0.190 | 1.809 | 3.33 | 884 | 48.7 |

[a] Downstream oven temperature mean lowered to reduce oxidation density of stablized sample by 1%.
b Downstream oven temperature mean lowered to reduce oxidation density of stabilized sample by 2%.
[c] Reduced tension variability.
[d] Downstream oven temperature mean increased to reduce stabilization time by a factor of 2.
[e] Properties of fiber exiting the low temperature carbonization furnace (high temperature furnace turned off).

TABLE 8

Processing Conditions and Property Data for Carbon Fibers prepared from PAN precursor fibers having a denier of 1.33 dpf

| Example No. | % Stretch in OX-Pass # 1 | 2 | 3 | 4 | OX-Str. (%) | Temp. OX (° C.) | TR-Str. (%) | Temp. TR (° C.) | C2-Str. (%) | HTT (° C.) | WPUL (g/m) | Density (g/cm³) | Diameter (μm) | Strength (ksi) | Modulus (Msi) |
|---|---|---|---|---|---|---|---|---|---|---|---|---|---|---|---|
| Comparative 3.1 | 8.3 | 0 | 0 | 0 | 8.3 | 235 | 2.7 | 490 | −4.1 | 1250 | 0.858 | 1.790 | 7.1 | 620 | 33.1 |
| Comparative 3.2 | 8.3 | 0 | 0 | 0 | 8.3 | 223 | 2.7 | 523 | −3.7 | 1250 | 0.849 | 1.801 | 7.1 | 724 | 36.2 |
| Comparative 3.3 | 8.3 | 0 | 0 | 0 | 8.3 | 223 | 2.7 | 523 | −3.5 | 1250 | 0.848 | 1.799 | 7.1 | 702 | 37.1 |
| Comparative 3.4 | 13.7 | 0 | 0 | 0 | 13.7 | 223 | 5 | 523 | −3.5 | 1250 | 0.799 | 1.802 | 6.9 | 721 | 38.3 |

TABLE 8-continued

Processing Conditions and Property Data for Carbon Fibers prepared from PAN precursor fibers having a denier of 1.33 dpf

| Example No. | % Stretch in OX-Pass # 1 | 2 | 3 | 4 | OX-Str. (%) | Temp. OX (° C.) | TR-Str. (%) | Temp. TR (° C.) | C2-Str. (%) | HTT (° C.) | WPUL (g/m) | Density (g/cm³) | Diameter (μm) | Strength (ksi) | Modulus (Msi) |
|---|---|---|---|---|---|---|---|---|---|---|---|---|---|---|---|
| Comparative 3.5 | 13.7 | 0 | 0 | 0 | 13.7 | 223 | 5 | 523 | −3.5 | 1315 | 0.793 | 1.780 | 6.9 | 756 | 36.0 |
| 3.6 | 50 | 20 | 0 | 0 | 80 | 223 | 5 | 523 | −3.5 | 1315 | 0.499 | 1.779 | 5.5 | 791 | 42.1 |
| 3.7 | 50 | 20 | 5.5 | 5.3 | 100 | 223 | 18 | 523 | −3.5 | 1250 | 0.400 | 1.806 | 4.9 | 766 | 41.6 |
| 3.8 | 50 | 20 | 5.5 | 5.3 | 100 | 223 | 18 | 523 | −3.5 | 1315 | 0.394 | 1.788 | 4.8 | 773 | 42.2 |
| 3.9 | 50 | 20 | 5.5 | 5.3 | 100 | 223 | 24 | 523 | −3.5 | 1315 | 0.374 | 1.792 | 4.7 | 781 | 43.1 |
| 3.10 | 50 | 20 | 5.5 | 5.3 | 100 | 223 | 28 | 523 | −3.5 | 1315 | 0.328 | 1.790 | 4.4 | 774 | 47.2 |

TABLE 9

Processing Conditions and Property Data for Carbon Fibers prepared from PAN precursor fibers having a denier of 1.53 dpf

| Example No. | % Stretch in OX-Pass # 1 | 2 | 3 | 4 | OX-Str. (%) | Temp. OX (° C.) | TR-Str. (%) | Temp. TR (° C.) | C2-Str. (%) | HTT (° C.) | WPUL (g/m) | Density (g/cm³) | Diameter (μm) | Strength (ksi) | Modulus (Msi) |
|---|---|---|---|---|---|---|---|---|---|---|---|---|---|---|---|
| Comparative 4.1 | 8.3 | 0 | 0 | 0 | 8.3 | 223 | 2.7 | 523 | −3.7 | 1250 | 1.781 | 1.798 | 7.2 | 544 | 31.2 |
| Comparative 4.2 | 8.3 | 0 | 0 | 0 | 8.3 | 235 | 2.7 | 490 | −4.1 | 1280 | 3.283 | 1.785 | 7.1 | 516 | 30.1 |
| Comparative 4.3 | 8.3 | 0 | 0 | 0 | 8.3 | 223 | 12 | 523 | −3.5 | 1315 | 1.618 | 1.810 | 6.9 | 558 | 34.0 |
| 4.3 | 50 | 16 | 4.6 | 2.2 | 86 | 223 | 12 | 523 | −3.5 | 1315 | 0.961 | 1.785 | 5.3 | 519 | 36.5 |
| 4.4 | 60 | 13 | 3.6 | 2 | 91 | 223 | 12 | 523 | −3.5 | 1315 | 0.937 | 1.786 | 5.3 | 524 | 36.8 |
| 4.5 | 60 | 13 | 3.6 | 2 | 91 | 223 | 24 | 523 | −2.9 | 1315 | 0.826 | 1.786 | 5.0 | 528 | 40.9 |
| 4.6 4.7[a] | 60 | 13 | 3.6 | 2 | 91 | 223 | 24 | 523 | −3.5 | 1315 | 0.882 | 1.780 | 5.1 | 607 | 45.3 |

[a]Performed at twice the standard carbonization residence time.

In the Examples in Tables 6 through 9 it can be readily seen that controlled stretching of the carbon fibers in accordance with the invention results in carbon fibers having improved tensile strength and modulus of elasticity in comparison to carbon fibers that are prepared according to conventional methods. For instance, in Table 6, Example 35 shows significant improvement in tensile strength and modulus of elasticity over a carbon fiber prepared using conventional techniques, such as Comparative Example 1. Specifically, gains in tensile strength and in modulus of up to ~20% were achieved by subjecting the 0.6 dpf precursor to controlled oxidation stretching and subsequent carbonization at the conditions specified in Example 35. These conditions corresponded to between one and two transitions in each of the four passes employed. Other conditions led to different combinations of transitions and, accordingly, different mechanical properties in the resulting carbon fibers, as discussed below.

Comparative Examples 1-4 show that gains in mechanical properties are achievable by improving the mechanical performance of the line, specifically by taking steps to reduce tension variability. For improved results, tension variability should preferably be within <5%, and most preferably be within <3%. In contrast, Comparative Examples 4-9 show that enhanced mechanical properties of the order achieved by the invention cannot be realized by a conventional art approach of applying a high overall oxidation stretch at a high strain rate early on in the oxidation process.

Examples 1-5 and Comparative Example 6 were run as a set to illustrate the effect of oxidation stretch distribution on the mechanical properties of carbon fibers of similar overall oxidation stretch and filament diameter. For an overall oxidation stretch of 15%, and a filament diameter of ~4.35 μm, the samples tested show significant increases in tensile strength and modulus (~10% and ~7%, respectively). Since these increases were achieved by varying only the distribution of oxidation stretches per pass, it follows that oxidation stretching has a direct impact on the mechanical properties of carbon fibers, independently of their filament diameter.

Example 5 also illustrates the effect of applying shrinkage as an intermediate step (in pass #3-4) during oxidation. Comparison with Examples 1-4 shows that allowing the fiber to shrink during an intermediate oxidation step is not detrimental to fiber properties, and can be used to increase filament diameter. This result illustrates the advantages of applying tailored combinations of stretch and shrinkage protocols to produce carbon fibers of desired mechanical properties, diameter and weight per unit length.

Examples 6-61 exemplify a systematic investigation of transitions and their impact on the mechanical properties of fibers made from the 0.6 dpf precursor at a variety of experimental conditions. Those skilled in the art will recognize the beneficial effects of parameters such as low and high temperature carbonization furnace stretches and temperatures on the results. However, the magnitudes of the stretches involved are relatively large compared to prior art. Those skilled in the art will also recognize additional examples of improvements in mechanical properties of fibers of similar diameter, achieved only through changes in oxidation stretching distribution parameters (for example, compare Examples 41 and 55).

Examples 42-53 illustrate the effect of increasing the carbonization temperature above 1,350° C. in order to increase modulus. As expected, tensile strength decreases with increasing carbonization temperature. However, the tensile strength values remain above 850 ksi, which is unexpected for carbon fibers with modulus up to 58 Msi (see Example 53).

Tables 7-9 confirm that the method of the invention also leads to increases in mechanical properties when applied to PAN precursors of larger filament denier (Tables 7-9) and composition (Table 9). Those skilled in the art will recognize that some of the combinations of mechanical properties listed in these Tables are unexpectedly high for materials made from the larger denier (more economical) precursors.

Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A carbon fiber having a modulus of elasticity of at least 45 Msi, and a maximum phase angle depth between 32 and 50 nm.

2. The carbon fiber according to claim 1, wherein the carbon fiber has an Arithmetic Average Roughness (Ra) between 2 and 5.9.

3. The carbon fiber according to claim 1, wherein the carbon fiber has a radial uniformity value RU from 50 to 1,000.

4. The carbon fiber according to claim 1, wherein the carbon fiber has a modulus of elasticity from about 45 to 53.3 Msi.

5. The carbon fiber according to claim 1, wherein the carbon fiber has a modulus of elasticity from about 50 to 53.3 Msi.

6. The carbon fiber according to claim 1, wherein the carbon fiber has a modulus of elasticity from about 51.5 to 53.3 Msi.

7. The carbon fiber according to claim 1, wherein the carbon fiber has at least one of the following
a maximum phase angle depth between 40 and 50 nanometers;
an average phase angle depth between 10 to 14 nanometers; and
a roughness having a Root Mean Square Roughness (Rq) value between 2 and 8.2.

8. The carbon fiber according to claim 1, wherein the carbon fiber has an Arithmetic Average Roughness (Ra) from 2 to 5.9.

9. A carbon fiber having a modulus of elasticity from about 45 to 53.3 Msi, and an average phase angle depth between 10 to 15.1 nanometers.

10. The carbon fiber according to claim 9, wherein the carbon fiber has a modulus of elasticity from about 50 to 53.3 Msi and a radial uniformity value RU from 50 to 1,000.

11. The carbon fiber according to claim 9, wherein the carbon fiber has at least one of the following
a maximum phase angle depth between 32 and 50 nanometers; and
an average phase angle depth between 10 to 14 nanometers.

12. The carbon fiber according to claim 9, wherein the carbon fiber has a crystalline width value $L_a$ between 4 and 5.7 nanometers and an Arithmetic Average Roughness (Ra) between 2 and 5.9.

13. The carbon fiber according to claim 9, wherein the carbon fiber has a radial uniformity value RU from 50 to 100.

14. The carbon fiber according to claim 9, wherein the carbon fiber has an Arithmetic Average Roughness (Ra) between 2 and 5.9; and a roughness having a Root Mean Square Roughness (Rq) value between 2 and 8.2.

15. The carbon fiber according to claim 9, wherein the carbon fiber has a tensile strength of at least 1058 ksi.

16. A carbon fiber having a modulus of elasticity from about 50 to 53.3 Msi and a difference in crystallinity "RD" between the inner and outer layers of a single filament that is from 0.01 to 0.05.

17. The carbon fiber according to claim 16, wherein the carbon fiber has a modulus of elasticity from about 51.5 to 53.3 Msi and an average phase angle depth between 5 to 15.1 nanometers.

18. The carbon fiber according to claim 16, wherein the carbon fiber has a roughness having a Root Mean Square Roughness (Rq) value between 3.9 and 8.2 and a radial uniformity RU value of about 50 to about 1000.

19. The carbon fiber according to claim 16, wherein the carbon fiber has a maximum phase angle depth between 32 and 50 nm.

20. The carbon fiber according to claim 16, wherein the carbon fiber has at least two of the following
an Arithmetic Average Roughness (Ra) between 2 and 5.9;
a maximum phase angle depth between 32 and 50 nanometers; and
an average phase angle depth between 5 to 15.1 nanometers;
a crystalline width value $L_a$ between 4 and 5.7 nanometers;
a roughness having a Root Mean Square Roughness (Rq) value between 2 and 8.2; and
a radial uniformity RU value of about 50 to about 1000.

21. The carbon fiber according to claim 16, wherein the carbon fiber has a tensile strength of at least 1000 ksi.

* * * * *